US009260328B2

(12) United States Patent
Ferguson et al.

(10) Patent No.: US 9,260,328 B2
(45) Date of Patent: Feb. 16, 2016

(54) CHEMICAL FEEDER

(71) Applicant: Axiall Ohio, Inc., Atlanta, GA (US)

(72) Inventors: Richard H. Ferguson, Cecil, PA (US); Stanley R. Pickens, Monroeville, PA (US)

(73) Assignee: AXIALL OHIO, INC., Atlanta, GA (US)

( * ) Notice: Subject to any disclaimer, the term of this patent is extended or adjusted under 35 U.S.C. 154(b) by 0 days.

(21) Appl. No.: 14/523,991

(22) Filed: Oct. 27, 2014

(65) Prior Publication Data

US 2015/0132197 A1 May 14, 2015

Related U.S. Application Data

(60) Provisional application No. 61/903,533, filed on Nov. 13, 2013, provisional application No. 61/926,433, filed on Jan. 13, 2014.

(51) Int. Cl.

*B65G 59/00* (2006.01)
*B67D 5/56* (2006.01)
*B08B 3/00* (2006.01)
*C02F 1/68* (2006.01)
*B01D 11/02* (2006.01)
*B01F 1/00* (2006.01)
*B01F 15/02* (2006.01)

(Continued)

(52) U.S. Cl.

CPC ............... *C02F 1/688* (2013.01); *B01F 1/0027* (2013.01); *B01F 15/0254* (2013.01); *B01J 4/001* (2013.01); *C02F 1/68* (2013.01); *B01F 2215/0052* (2013.01); *B01J 2219/00761* (2013.01); *C02F 2103/42* (2013.01); *C02F 2303/04* (2013.01)

(58) Field of Classification Search

CPC ....... A61L 2/00; B01F 1/0027; B01F 5/0496; B01F 15/00344; C02F 1/688; C02F 2103/42

USPC ........... 222/129, 478; 221/92; 134/43, 84, 93; 422/261, 265, 275, 277; 210/748.16, 210/749; 137/268

See application file for complete search history.

(56) References Cited

U.S. PATENT DOCUMENTS 2,820,701 A 1/1958 Leslie
5,089,127 A 2/1992 Junker et al.
5,384,102 A 1/1995 Ferguson et al.

(Continued)

*Primary Examiner* — Monzer R Chorbaji
(74) *Attorney, Agent, or Firm* — The Webb Law Firm

(57) ABSTRACT

The present invention relates to a chemical feeder that includes a support plate that is positioned within the housing chamber of the chemical feeder. The support plate includes a base plate that has one or more extensions that extend upward from an upper surface of the base plate. The extensions can, with some embodiments, be in the form of peg extensions, arcuate extensions that can together define an impeller pattern, or a spiral extension. The support plate also includes a deflection plate that is positioned vertically above at least one support plate aperture that extends through the base plate. The deflection plate also includes at least one deflection plate hole therethrough. A first portion of liquid passing up through the support plate aperture is horizontally deflected by the deflection plate and interacts with the extensions. A second portion of liquid passing up through the support plate aperture passes vertically up through the deflection plate hole(s). The first and second portions of liquid contact a solid chemical material that is supported above the support plate, so as to form a treated liquid that includes dissolved chemical material.

40 Claims, 9 Drawing Sheets

38 93 93 93 88 85 111 102 88 82 82 82 105 82 105 44 111 99 96 114 135 120 90 90 76 47 120 41 135 79 108 108

(51) Int. Cl.

*B01J 4/00* (2006.01)
*C02F 103/42* (2006.01)

(56) References Cited

U.S. PATENT DOCUMENTS

| | | | | |
|---|---|---|---|---|
| 5,427,748 | A | 6/1995 | Wiedrich et al. | |
| 5,441,073 | A | 8/1995 | Hoadley | |
| 5,810,043 | A | 9/1998 | Grenier | |
| 6,138,703 | A | 10/2000 | Ferguson et al. | |
| 6,298,871 | B1 | 10/2001 | Pickens et al. | |
| 6,517,727 | B2 | 2/2003 | Pickens et al. | |
| 6,544,487 | B1 | 4/2003 | Ferguson et al. | |
| 7,081,232 | B1 | 7/2006 | Dooley, Jr. et al. | |
| 7,604,018 | B2 * | 10/2009 | King | B01F 1/0033 137/1 |
| 2005/0150823 | A1 | 7/2005 | Eserkaln et al. | |
| 2010/0012560 | A1 | 1/2010 | Sims et al. | |

* cited by examiner

CHEMICAL FEEDER

CROSS REFERENCE TO RELATED APPLICATION

The present application is entitled to and claims priority to U.S. Provisional Patent Application No. 61/903,533, filed on Nov. 13, 2013, and U.S. Provisional Patent Application No. 61/926,433, filed on Jan. 13, 2014, the disclosures of which are each incorporated herein by reference in their entirety.

FIELD

The present invention relates to a chemical feeder that includes a support plate having raised extensions that extend upward from the upper surface of the base plate of the support plate, and a deflection plate that this positioned vertically above and spaced from one or more support plate apertures that extend through the base plate.

BACKGROUND

Chemical feeders can be used to produce various mixtures, such as aqueous solutions of water treating agents that can be used for the disinfection of effluent from sewage treatment plants, for the chlorination of water in swimming pools and hot tubs, and for the delivery of other water soluble chemicals to aqueous streams and water systems. In some instances, a solid treatment chemical is placed within the chemical feeder, where it comes into contact with a liquid, such as water, introduced therein so as to form a treated liquid composition, such as a treated aqueous composition. It is typically desirable that the chemical feeder produce treated liquid compositions that contain a controllable and reproducible level of treatment chemical therein. Variability in the rate at which a solid treatment chemical dissolves in the liquid that is introduced into the chemical feeder can result in an undesirable variation in the concentration of treatment chemical in the treated liquid that is removed from the chemical feeder during operation thereof. In the case of sanitizing treatment chemicals, for example, such variability in the concentration of the sanitizing chemical(s) can result in reduced sanitizing properties, when the concentration drops below a minimum threshold, or toxicity, when the concentration rises above a maximum threshold.

It would be desirable to develop new chemical feeders, such as but not limited to erosion chemical feeders and flow-through chemical feeders, that can be used to produce treated liquid compositions from solid treatment chemicals. It would be further desirable that such newly developed chemical feeders provide a controllable, reliable, and reproducible level of treatment chemical in the treated liquid compositions that are removed from the chemical feeder.

SUMMARY

In accordance with the present invention, there is provided, a chemical feeder comprising: (a) a housing having a housing base and housing sidewalls that together define a housing chamber within the housing; (b) a support plate comprising a base plate having an upper surface and a lower surface, the support plate residing within the housing chamber and being positioned above an inner surface of the housing base, and the support plate being adapted to support a solid chemical material above the upper surface of the base plate; (c) at least one inlet in the housing through which liquid is introduced into the housing, the inlet being positioned below the support plate; and (d) at least one outlet in the housing through which a treated liquid comprising dissolved chemical material is removed from the housing. The support plate comprises: (i) at least one support plate aperture extending from the lower surface to the upper surface of the base plate, through which liquid introduced through the inlet passes upward, (ii) a plurality of extensions extending upward from the upper surface of the base plate, each extension being a peg extension, and (iii) a deflection plate positioned vertically above and spaced from the support plate aperture, and the deflection plate comprising at least one deflection plate hole therethrough, wherein the deflection plate deflects horizontally a first portion of liquid passing up through the support plate aperture, and a second portion of liquid passing up through the support plate aperture passes vertically through the deflection plate hole.

In accordance with the present invention, there is further provided, a chemical feeder comprising: (a) a housing having a housing base and housing sidewalls that together define a housing chamber within the housing; (b) a support plate comprising a base plate having an upper surface and a lower surface, the support plate residing within the housing chamber and being positioned above an inner surface of the housing base, and the support plate being adapted to support a solid chemical material above the upper surface of the base plate; (c) at least one inlet in the housing through which liquid is introduced into the housing, the inlet being positioned below the support plate; and (d) at least one outlet in the housing through which a treated liquid comprising dissolved chemical material is removed from the housing. The support plate comprises: (i) at least one support plate aperture extending from the lower surface to the upper surface of the base plate, through which liquid introduced through the inlet passes upward; (ii) a plurality of arcuate extensions extending upward from the upper surface of the base plate; and (iii) a deflection plate positioned vertically above and spaced from the support plate aperture, and the deflection plate comprising at least one deflection plate hole therethrough, wherein the deflection plate deflects horizontally a first portion of liquid passing up through the support plate aperture, and a second portion of liquid passing up through the support plate aperture passes vertically through the deflection plate hole.

In accordance with the present invention, there is additionally provided, a chemical feeder comprising: (a) a housing having a housing base and housing sidewalls that together define a housing chamber within the housing; (b) a support plate comprising a base plate having an upper surface and a lower surface, the support plate residing within the housing chamber and being positioned above an inner surface of the housing base, and the support plate being adapted to support a solid chemical material above the upper surface of the base plate; (c) at least one inlet in the housing through which liquid is introduced into the housing, the inlet being positioned below the support plate; and (d) at least one outlet in the housing through which a treated liquid comprising dissolved chemical material is removed from the housing. The support plate comprises: (i) at least one support plate aperture extending from the lower surface to the upper surface of the base plate, through which liquid introduced through the inlet passes upward; (ii) a spiral extension extending upward from the upper surface of the base plate, the spiral extension extending spirally outward relative to the support plate aperture, and the spiral extension defining a spiral channel; and (iii) a deflection plate positioned vertically above and spaced from the support plate aperture, and the deflection plate comprising at least one deflection plate hole therethrough, wherein the deflection plate deflects horizontally a first portion of liquid passing up through the support plate aperture, and a second portion of liquid passing up through the support plate aperture passes vertically through the deflection plate hole.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1A through 7 like characters refer to the same components and/or streams, such as liquid streams, as the case may be, unless otherwise stated.

DETAILED DESCRIPTION

Figure 1A:
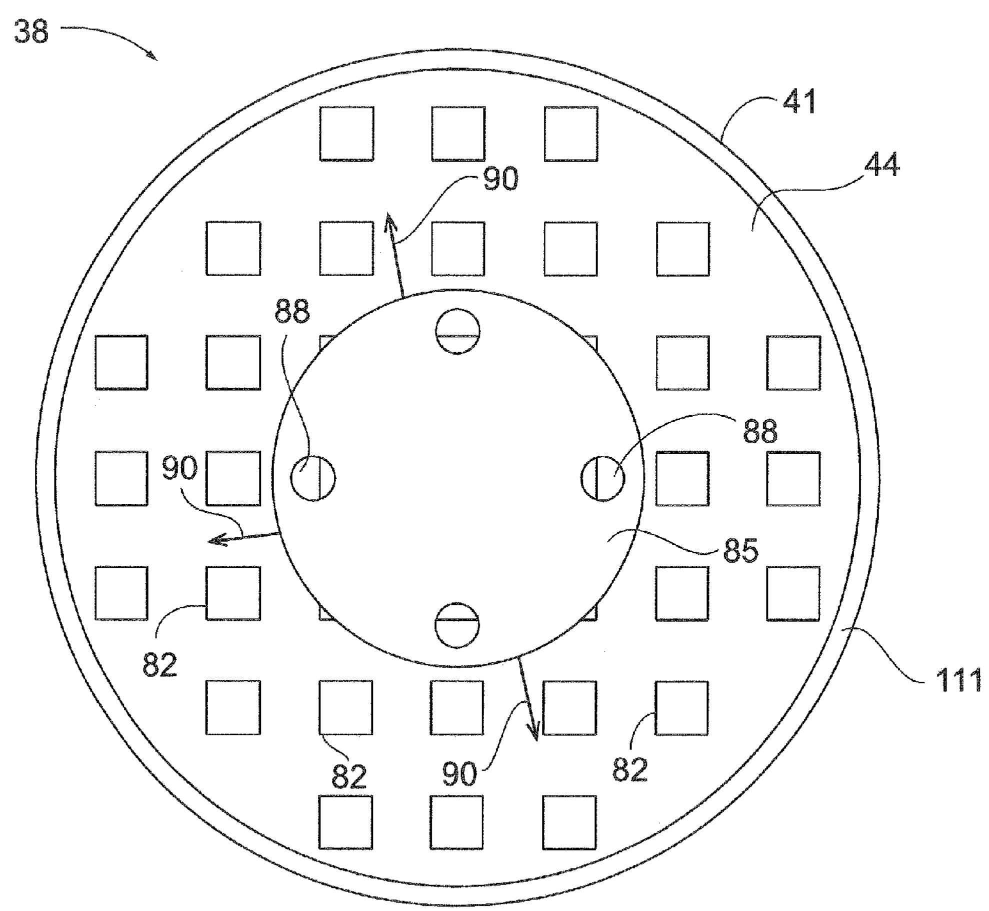
FIG. 1A is a representative top plan view of a support plate in accordance with some embodiments of the present invention, which has a plurality of peg extensions.

As used herein, the singular articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, quantities of ingredients, flow rates, pressures, and so forth used in the specification and claims are to be understood as modified in all instances by the term "about."

All documents, such as but not limited to issued patents and patent applications, referred to herein, and unless otherwise indicated, are to be considered to be "incorporated by reference" in their entirety.

As used herein, spatial or directional terms, such as "left", "right", "inner", "outer", "above", "below", "vertically", "upward", and the like, relate to embodiments of the invention as depicted in the drawing figures. However, it is to be understood that the invention can assume various alternative orientations and, accordingly, such terms are not to be considered as limiting.

Figure 5:
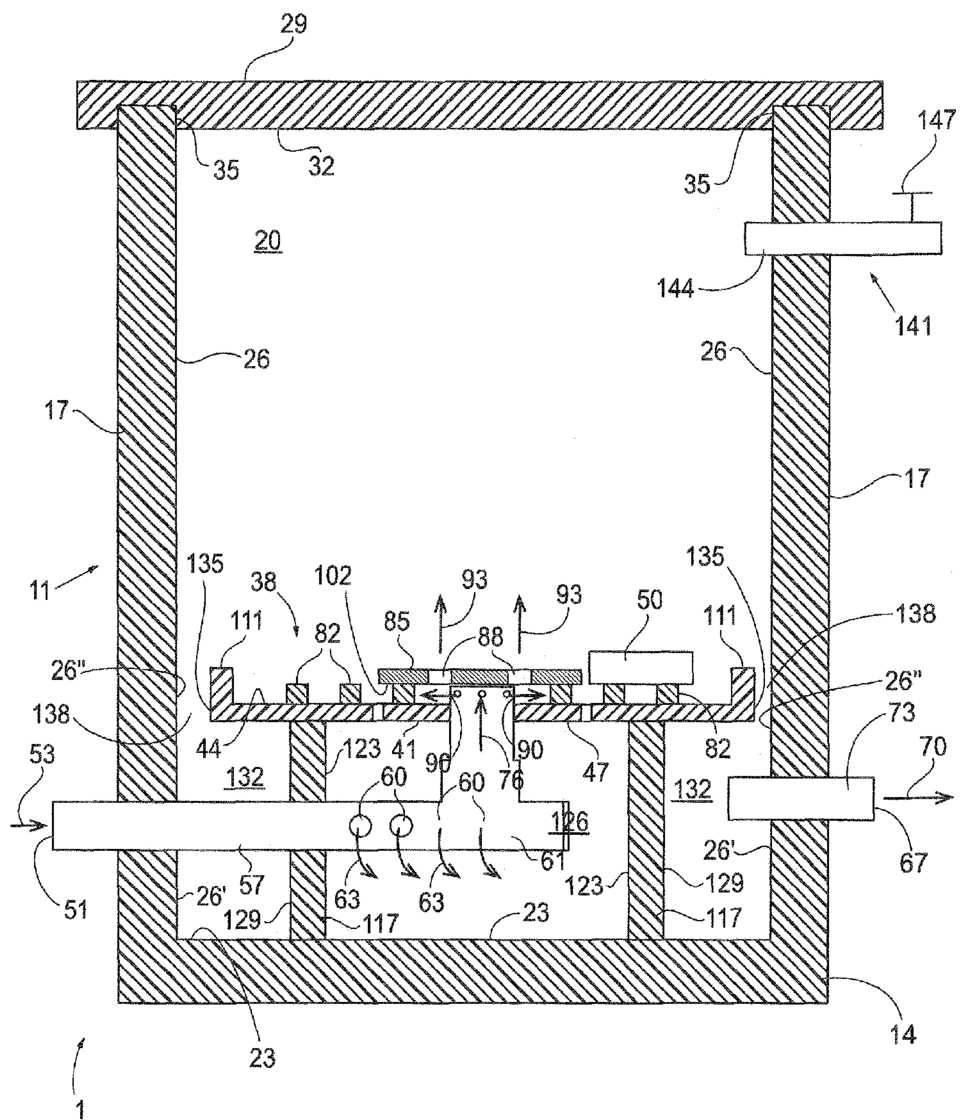
FIG. 5 is a representative side elevational partial sectional view of a chemical feeder in accordance with some embodiments of the present invention.

With reference to FIG. 5 of the drawings, there is depicted a chemical feeder 1 according to some embodiments of the present invention. Chemical feeder 1 includes a housing 11 that includes a housing base 14 and housing sidewalls 17 that extend upward from housing base 14. Housing base 14 and housing sidewalls 17 together define a housing chamber 20 that resides within housing 11. More particularly, housing base 14 has an inner surface 23, and sidewalls 17 have an inner surface 26. Inner surface 23 of housing base 14 and inner surface 26 of sidewalls 17 together define housing chamber 20, with some embodiments.

Housing 11, with some embodiments, is a substantially cylindrical housing. Housing 11 can, with some further embodiments, have other shapes including, but not limited to, spherical and multi-sided shapes, such as, square-tubular, recta-tubular, hexa-tubular and octa-tubular. With some embodiments, the shape of housing chamber 20 defined by interior surfaces 23 and 26 can be different than the external shape of housing sidewalls 17 and housing base 14. For purposes of non-limiting illustration, the exterior shape of housing sidewalls 17 can be square, and housing base 14 can be square or circular, while interior surfaces 23 and 26 define a substantially cylindrical housing chamber 20.

Housing base 14 is affixed to the bottom of housing sidewalls 17. With some embodiments, housing base 14 is attached to the bottom of housing sidewalls 17 by art-recognized reversibly closeable systems, such as, matching threaded sections and/or fasteners (not shown). In accordance with some further embodiments, housing base 14 is attached to housing sidewalls 17 by a substantially permanent system, such as by adhesives and/or welds. Inner surface 23 of housing base 14 can define or have any suitable surface or shape, such as a sectional shape, including, but not limited to, a flat shape (as depicted in the drawings), polygonal shapes, elliptical shapes, and hemispherical shapes, in which the polygonal, elliptical, and hemispherical shapes can each further define convex shapes and concave shapes, and combinations of such shapes.

Housing 11, with some embodiments, has a closed top. With some further embodiments, the top of housing 11 is closed with a lid, which can be reversibly closeable. As shown, housing 11 has a lid 29 attached thereto. Lid 29 engages sealingly with the top of housing sidewalls 17. Lid 29 can be attached to the top of housing sidewalls 17 by art-recognized systems, which include, for example, bolts, clamps, and/or matching threaded sections (not shown). In FIG. 5, lid 29 includes an annular groove 35 in inner surface 32 thereof, into which is received the top of housing sidewalls 17, so as to attach lid 29 to the top of housing sidewalls 17. Annular groove 35, with some embodiments, includes a gasket, such as an annular gasket (not shown) that serves to provide a sealing fit between annular groove 35 and the tops of sidewalls 17. The interior surface 32 of lid 29 together with the interior surfaces 26 and 23 of housing sidewalls 17 and housing base 14, also serve to define housing chamber 20, with some embodiments.

Figure 2:
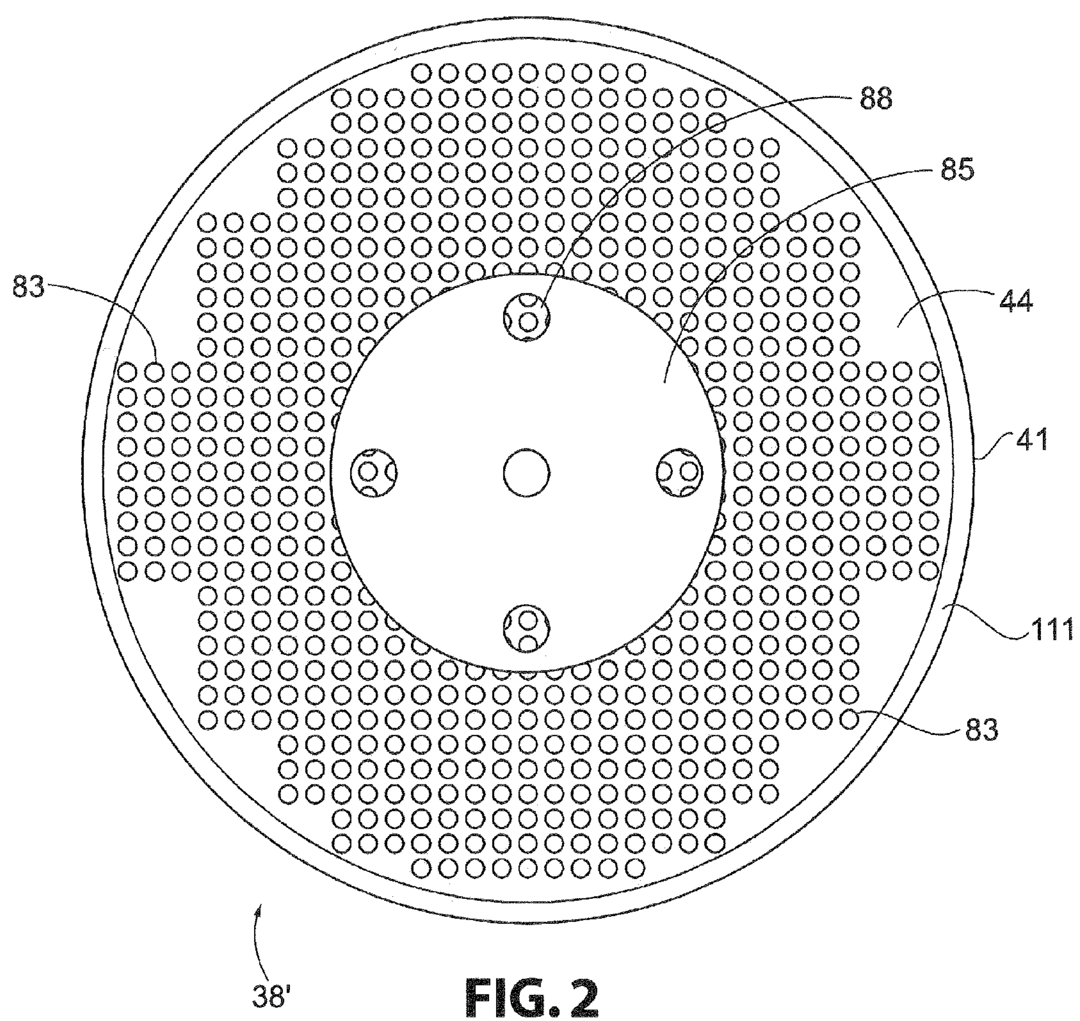
FIG. 2 is a representative top plan view of a support plate in accordance with some embodiments of the present invention, which has a plurality of peg extensions.
Figure 3A:
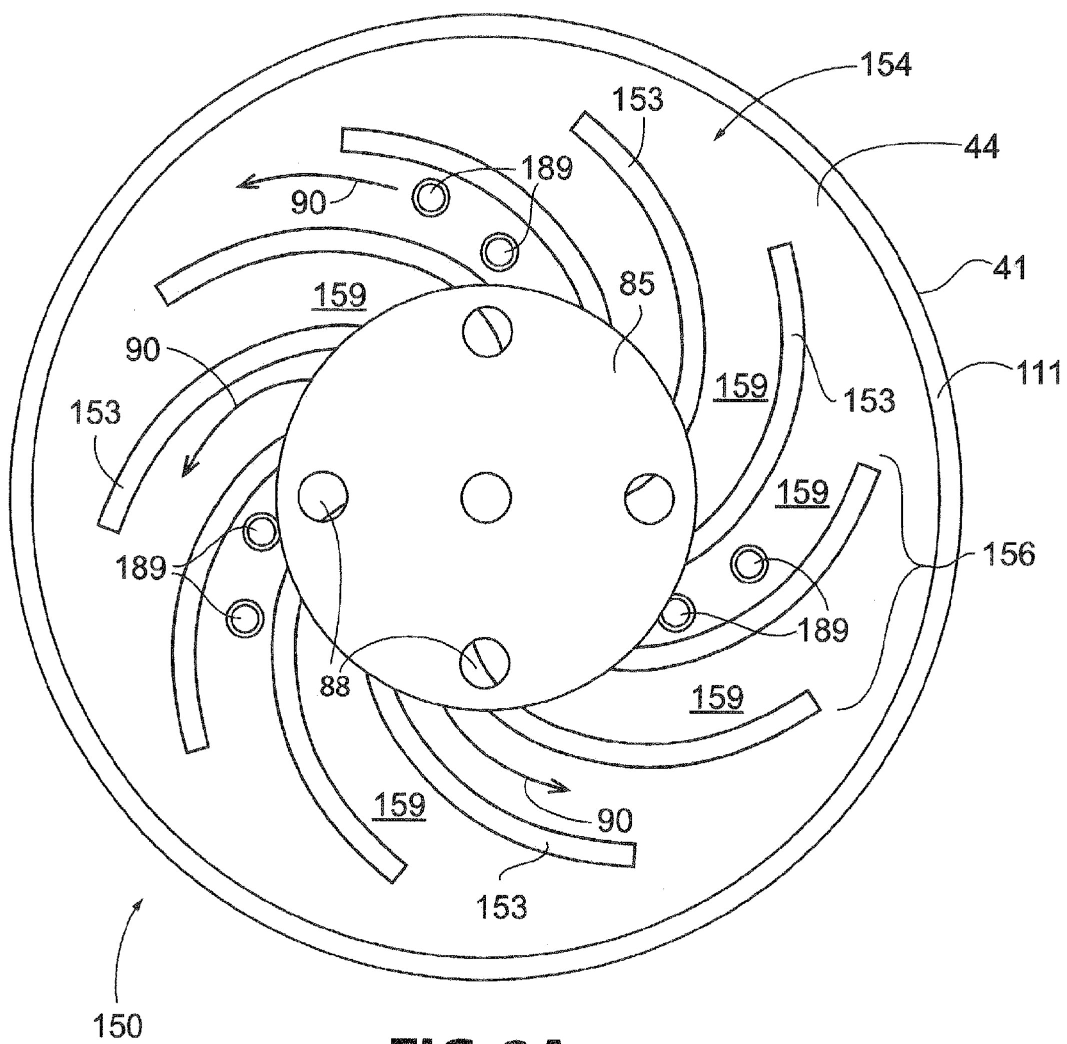
FIG. 3A is a representative top plan view of a support plate in accordance with some embodiments of the present invention, which has a plurality of arcuate extensions.
Figure 3B:
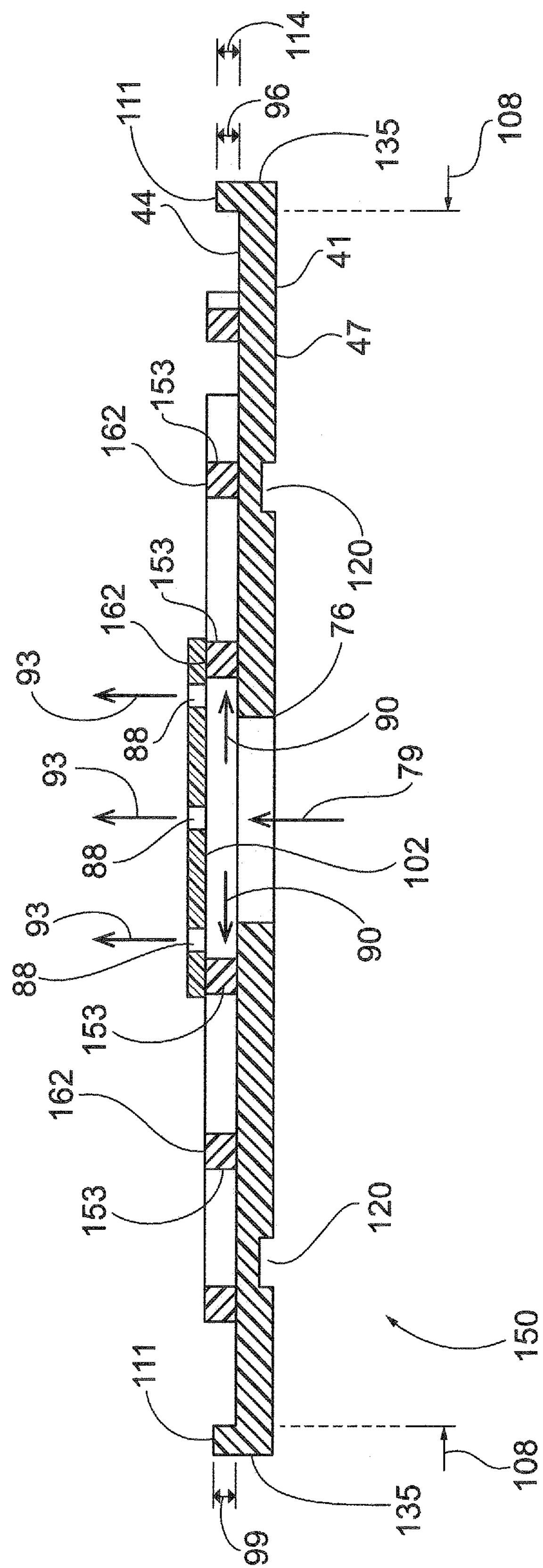
FIG. 3B is a representative side elevational sectional view of the support plate of FIG. 3A.
Figure 4A:
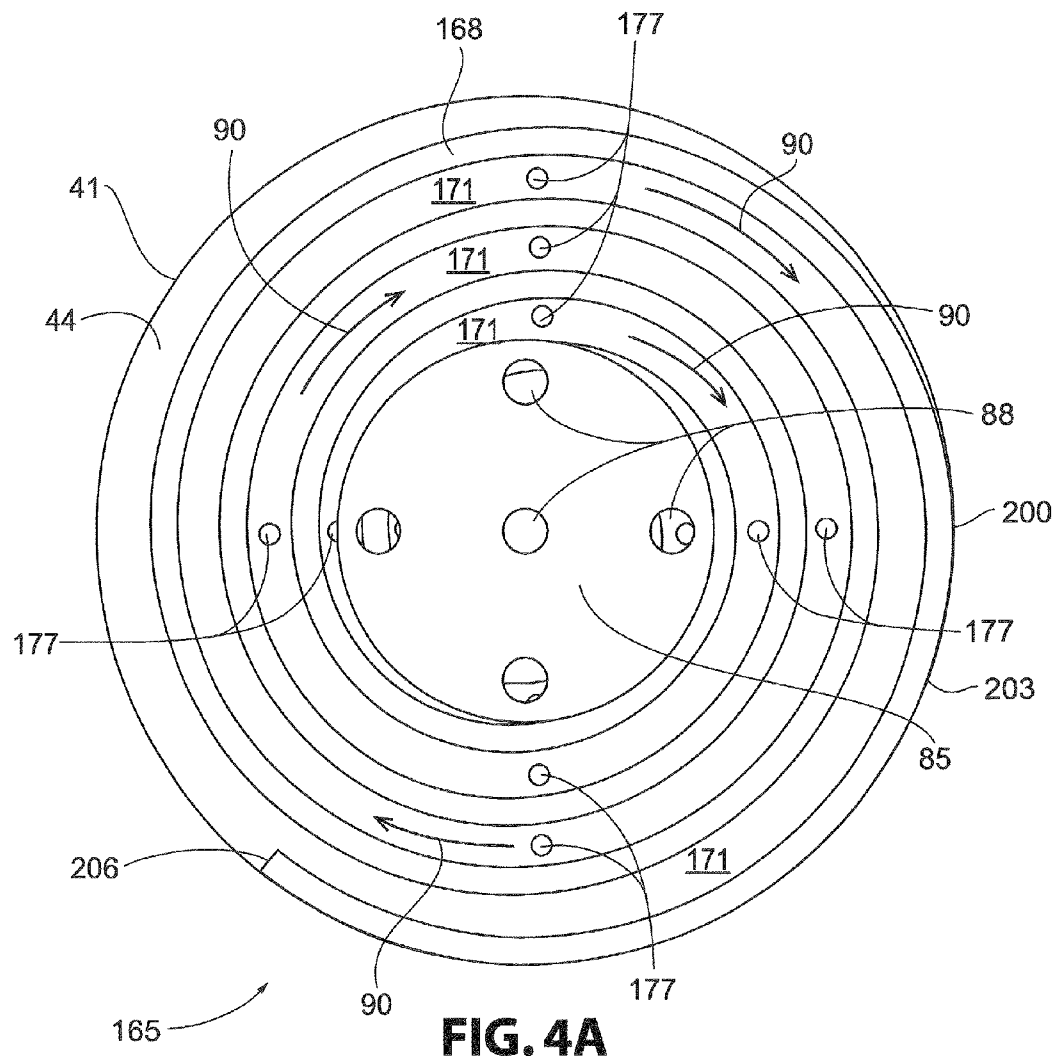
FIG. 4A is a representative top plan view of a support plate in accordance with some embodiments of the present invention, which has a spiral extension.
Figure 4B:
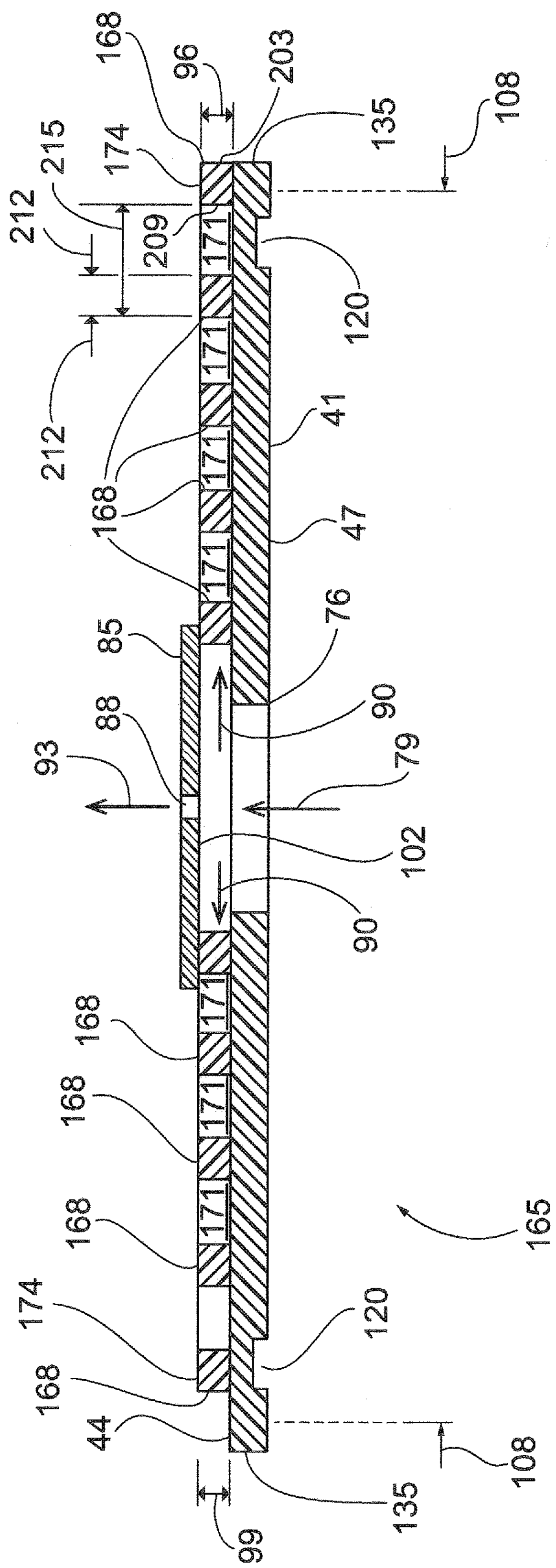
FIG. 4B is a representative side elevational sectional view of the support plate of FIG. 4A.

With further reference to FIG. 5, chemical feeder 1 also includes a support plate 38 that includes a base plate 41. Base plate 41 has an upper surface 44 and a lower surface 47. Support plate 38 resides within housing chamber 20 and is positioned above inner surface 23 of housing base. Support plate 38 is adapted to support a solid chemical material 50 above upper surface 44 of base plate 41. The solid chemical material 50 as depicted in FIG. 5 is in the form of a tablet, of which a single tablet is shown (for ease of depiction). With some embodiments, a plurality of tablets (not shown) are present in housing chamber 20 and supported by support plate 38. The solid chemical material can, with some embodiments, be in the form of granules, pellets, and/or tablets, provided that it is of a size that will not fall down through or otherwise clog one or more apertures or annular openings of or associated with the support plate. The solid chemical materials that can be used with the chemical feeders of the present invention are discussed in further detail herein. Support plate 38 of chemical feeder 1 of FIG. 5 can be replaced with other support plates according to further embodiments of the present invention, such as, but not limited to, support plate 38' as depicted in FIG. 2, support plate 150 as depicted in FIGS. 3A and 3B, and support plate 165 as depicted in FIGS. 4A and 4B, which are each described in further detail herein.

The support plate of the chemical feeders of the present invention can have any suitable shape, such as circular shapes, elliptical shapes, polygonal shapes (such as, triangular, rectangular, pentagonal, hexagonal, etc.), and combinations thereof. With some embodiments, and as depicted in the drawing figures, the support plate has a substantially circular shape.

Chemical feeder 1 further includes at least one inlet 51 in housing 11 through which liquid, as depicted with arrow 53, is introduced into housing 11, such as into housing chamber 20. Inlet 51 is positioned below the support plate, such as support plate 38. With some embodiments, the inlet is located in a sidewall of the housing. As depicted in FIG. 5, inlet 51 is positioned in sidewall 17. With some embodiments, inlet 51 is in fluid communication with an inlet pipe 57 that extends underneath support plate 38, and which includes at least one inlet pipe aperture. As depicted, inlet pipe 57 has a plurality of inlet pipe apertures 60 that are positioned below support plate 38. Liquid introduced through inlet 51, passes through inlet pipe 57, and exits inlet pipe 57 through inlet pipe apertures 60 below support plate 38, as indicated by arrows 63. Inlet pipe 57, with some embodiments, has a terminal plug 61, as depicted.

Chemical feeder 1 further includes at least one outlet 67 in housing 11 through which a treated liquid that includes dissolved and/or eroded chemical material is removed from housing 11 (such as from housing chamber 20), as indicated by arrow 70. The outlet (or outlets) can be located in any appropriate position in the housing, such as in a housing sidewall and/or in the housing base, with some embodiments. With some embodiments the outlet is located in a sidewall of the housing. As depicted in FIG. 5, outlet 67 is positioned in sidewall 17 of housing 11. With some further embodiments, outlet 67 is in fluid communication with an outlet pipe 73 that extends through sidewall 17.

Figure 1B:
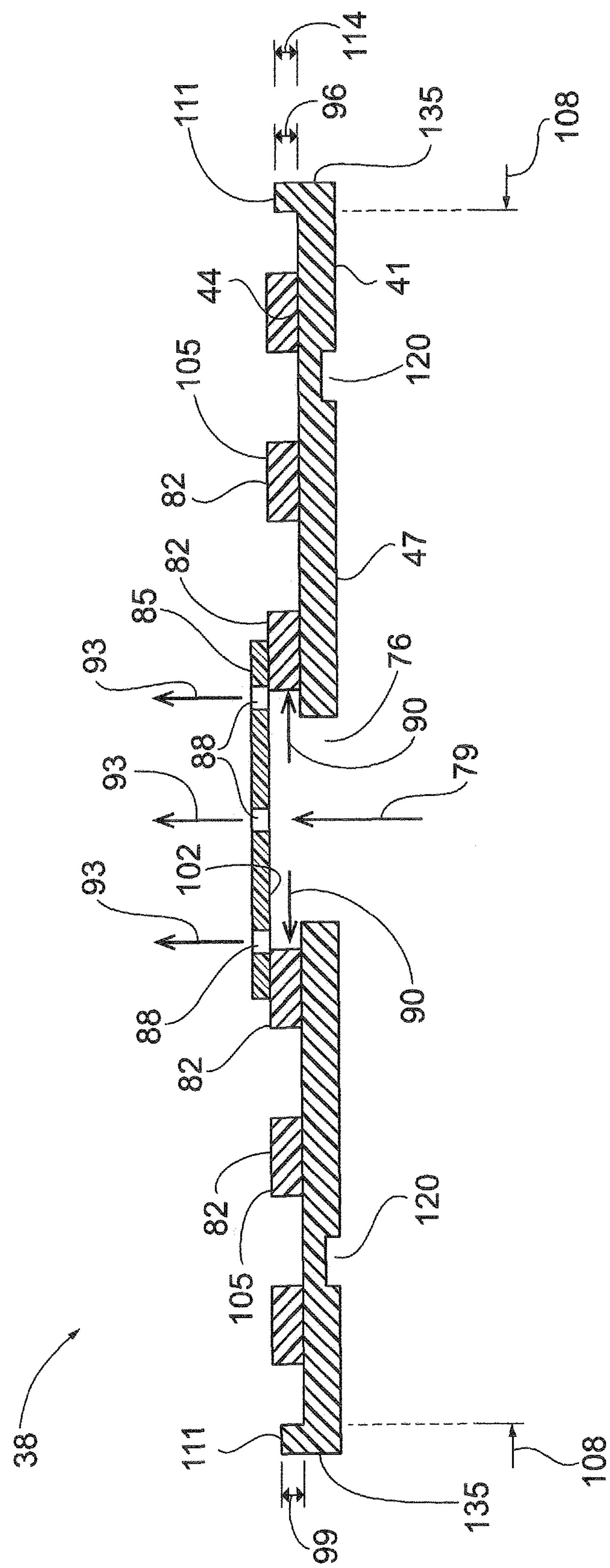
FIG. 1B is a representative side elevational sectional view of the support plate of FIG. 1A.

With reference to FIGS. 1A, 1B, and 5, support plate 38 includes at least one support plate aperture 76 that extends from lower surface 47 to upper surface 44 of base plate 41. Liquid introduced through inlet 51 passes upward through support plate aperture 76, as depicted by arrow 79. The support plate can, with some embodiments, include more than one support plate aperture, such as 2 to 10, or from 2 to 5 or from 2 to 4, or from 2 to 3 support plate apertures, provided that each support plate aperture resides below the deflection plate, such as deflection plate 85. The dimensions and sizes of the support plate aperture(s) is/are selected, which some embodiments, so as to provide a desired flow of liquid up through the support plate, which then contacts the solid chemical material. With some embodiments, the support plate includes a single support plate aperture, such as support plate aperture 76, which has a diameter of from 2.54 cm to 12.7 cm (1 inch to 5 inches), or from 3.81 cm to 10.16 cm (1.5 inches to 4 inches), such as 7.62 cm (3 inches).

Support plate 38 also includes a plurality of extensions 82 that extend upward from upper surface 44 of base plate 41. With some embodiments, each extension 82 is a peg extension. The peg extensions can also be referred to, with some embodiments, as stud extensions, pin extensions, and rod extensions.

Support plate 38 further includes a deflection plate 85 that is positioned vertically above and spaced from support plate aperture 76. Deflection plate 85 includes at least one deflection plate hole 88 therethrough. In FIGS. 1A, 2, 3A, and 4A, each deflection plate 85 is depicted transparently (as indicated by dashes) so that the underlying support plate aperture 76 is in each case visible.

During operation of chemical feeder 1, when a liquid is introduced into housing 11 through inlet 51, and in accordance with some embodiments, deflection plate 85 deflects horizontally a first portion of liquid passing up through support plate aperture 76, as depicted by arrows 90. A second portion of liquid passing up through support plate aperture 76 passes vertically through the deflection plate hole(s) 88, as indicated by arrows 93. With some embodiments, the first portion and the second portion together account for substantially 100 percent of the liquid introduced into housing 11 through inlet 51. With some further embodiments, the first portion and the second portion together account for less than 100 percent of the liquid introduced into housing 11 through inlet 51. With some additional embodiments, the first portion is less than, substantially equal to, or greater than the second portion; and correspondingly the second portion is less than, substantially equal to, or greater than the first portion.

While not intending to be bound by any theory, it is believed that the horizontally deflected first portion of liquid 90 efficiently contacts the bottom or lower surfaces of the solid chemical material that resides and is supported above upper surface 44 of base plate 41, such as by extensions 82 with some embodiments. Such efficient contact of the first portion of liquid 90 with bottom/lower surfaces of the solid chemical material is believed, with some embodiments, to evenly, controllably, and reproducibly dissolve the solid chemical material supported there-above, which results in the formation of a treated liquid having a controllable and reproducible level of chemical material dissolved therein.

With some embodiments, the deflection plate is supported, and positioned vertically above and spaced from the support plate aperture, by a portion of the extensions. With reference to FIG. 1B, deflection plate 85 is supported, and positioned vertically above and spaced from support plate aperture 76, by a portion of extensions 82.

Each extension, with some embodiments, has an extension height above the upper surface of the base plate of the support plate, each extension height is substantially equivalent to each other extension height, the lower surface of the deflection plate has a second height (or deflection plate height) above the upper surface of the base plate of the support plate, and each extension height and the second height are substantially equivalent. With reference to FIG. 1B, each extension 82 has an extension height 96 above upper surface 44 of base plate 41 of support plate 38, each extension height 96 is substantially equivalent to each other, the lower surface 102 of deflection plate 85 has a second height 99 above upper surface 44 of base plate 41 of support plate 38, and each extension height 96 and the second height 99 are substantially equivalent to each other.

With some further embodiments, at least some extensions 82 have extension heights 96 that are different from each other, provided that no extension height 96 is less than the second height 99 (or deflection plate height) of deflection plate 85. Some extensions 82 can, with some embodiments, have extension heights 96 that are greater than the second height 99 of deflection plate 85, but no extensions 82 have an extension height 96 that is less than the second height 99 of deflection plate 85. With some embodiments, each extension has an extension height that is equal to or greater than the deflection plate height.

Each extension can, with some embodiments, independently have an upper surface that is concave, convex, or substantially flat. The concave and convex upper surfaces of each extension can, with some embodiments have a cross-sectional shape selected from partial circular shapes, partial elliptical shapes, partial hyperbolic shapes, and partial polygonal shapes (such as, but not limited to, triangular shapes, rectangular shapes, pentagonal shapes, etc.).

Each extension, with some embodiments, has an upper surface that is a substantially flat surface. With reference to FIG. 1B, each extension 82 has an upper surface 105, and upper surface 105 is a substantially flat surface, as depicted.

The extensions, such as the peg extensions, of the support plate can each independently have any suitable shape. With some embodiments, each extension independently has a cross-sectional shape selected from circular shapes, ellipsoid shapes, polygonal shapes, and combinations of two or more thereof. The cross-sectional shape of the extensions, with some embodiments, is a lateral cross-sectional shape.

The extensions, such as peg extensions, of the support plate, can have any suitable spacing relative to each other and/or together define one or more patterns, provided, with some embodiments, the solid chemical material is controllably and reproducibly dissolved within the chemical feeder. The extensions can be evenly spaced from each other, randomly spaced from each other, or a combination thereof, with some embodiments. With some embodiments, the plurality of extensions, such as the peg extensions, are laterally spaced from each other. With some further embodiments, the extensions, such as the peg extensions, are substantially evenly spaced from each other, such as depicted with extensions 82 in FIG. 1A. For purposes of non-limiting illustration and in accordance with some embodiments, each extension 82 is evenly spaced from each other extension 82 by a distance of from 0.635 cm to 7.62 cm (0.25 inches to 3 inches), or from 1.27 cm to 5.08 cm (0.5 inches to 2 inches), or from 1.91 cm to 3.81 cm (0.75 inches to 1.5 inches), such as 2.54 cm (1 inch).

With reference to FIG. 2, support plate 38' includes a plurality of extensions 83 that have a substantially circular cross-sectional shape. With some embodiments, extensions 83 have a cross-sectional diameter of 0.318 cm (⅛ inch), and the center of each extension 83 is positioned 1.27 cm (0.5 inches) from the center of each neighboring extension 83.

With some embodiments, the plurality of extensions (or a portion of the plurality of extensions) support the solid chemical material above the upper surface of the base plate of the support plate. The extensions can, with some embodiments, directly and/or indirectly support the solid chemical material. Some of the solid chemical material, with some embodiments, is in direct contact with at some of the extensions, and as such is directly supported by such extensions. Some of the solid chemical material, with some embodiments, is in direct contact with the deflection plate, and is indirectly supported by the extensions that support the deflection plate. With reference to FIG. 5, some of extensions 82 support tablet 50 above upper surface 44 of base plate 41 of support plate 38.

The deflection plate, with some embodiments, extends over less than the total upper surface area of the base plate of the support plate. The base plate of the support plate, with some embodiments, has an upper surface area, and the deflection plate extends over less than all of the upper surface area of the base plate of the support plate. With non-limiting reference to FIG. 1B, base plate 41, of support plate 38, has an upper surface area, such as determined with regard to diameter 108 thereof, and deflection plate 85 extends over less than all of the upper surface area of base plate 41 of support plate 38. With some embodiments, the deflection plate extends over less than 50 percent of the upper surface area the base plate, such as from 5 percent to 45 percent, or from 10 percent to 30 percent, or from 15 percent to 25 percent of the upper surface area the base plate.

The base plates of the support plates of the chemical feeders of the present invention, with some embodiments, are free of apertures there-through outside of (or beyond) the outer edge of the deflection plate. The base-plate, in accordance with some further embodiments, has one or more apertures there-through, which reside outside of (or beyond) the outer edge of the deflection plate. In accordance with some further embodiments, the base plate includes a plurality of pores (or micro-pores), and is a porous (or micro-porous) base plate. The pores of the base plate, with some embodiments, have diameters of from 0.01 mm to 10 mm (10 μm to 10,000 μm).

The base plate of the support plate, with some embodiments, has an outer rim that extends upward relative to the upper surface of the base plate. With reference to FIG. 1B, base plate 41 of support plate 38 has an outer rim 111 that extends upward relative to upper surface 44 of base plate 41. With some embodiments, and not intending to be bound by any theory, it is believed that the outer rim of the base plate serves to maintain a level of liquid above the upper surface of the base plate, so as to optimize contact of liquid moving across the base plate with the bottom or lower surfaces of the solid chemical material that resides and is supported thereabove.

The outer rim of the base plate can have any suitable height above the upper surface of the base plate. With some embodiments, the outer rim has a height (an outer rim height) that is equal to or greater than (and correspondingly, not less than) the height of the lower surface of the deflection plate above the upper surface of the base plate (the deflection plate height). With some further embodiments: each extension (or peg extension) independently has an extension height that is less than, equal to, or greater than the height of the outer rim, provided that: (i) each extension (or peg extension) has a height that is equal to or greater than (and correspondingly, not less than) the deflection plate height; and (ii) the outer rim height is equal to or greater than (and correspondingly, not less than) the deflection plate height.

Each extension, such as each peg extension, has an extension height above the upper surface of the base plate, each extension height is substantially equivalent to each other, the outer rim has an outer rim height above the upper surface of the base plate, and each extension height and the outer rim height are substantially equivalent, with some embodiments. With non-limiting reference to FIG. 1B, each extension 82 has an extension height 96 above upper surface 44 of base plate 41, each extension height 96 is substantially equivalent to each other extension height 96, outer rim 111 has an outer rim height 114 above upper surface 44 of base plate 41, and each extension height 96 and the outer rim height 114 are substantially equivalent.

The support plates of the chemical feeders of the present invention can be fabricated by suitable methods. With some embodiments, the support plate is fabricated by: molding; by mechanical methods, such as with a computer numerical control (CNC) router; by gluing and/or welding; or any combination thereof. For purposes of non-limiting illustration, the extensions of the support plate can be formed: during molding of the support plate in a mold; with a CNC router that grinds away selected portions of the base plate so as to in effect lower the upper surface of the base plate while concurrently forming the extensions; by welding and/or gluing the extensions to the upper surface of the base plate; or any combination thereof.

The chemical feeder, with some embodiments, further includes inner sidewalls extending upward from the inner surface of the housing base, the support plate is supported by the inner sidewalls, and the inner sidewalls are spaced from the housing sidewalls. With reference to FIG. 5, chemical feeder 1 includes inner sidewalls 117 that extend upward from inner surface 23 of housing base 14. Support plate 38 is supported by inner sidewalls 117. Inner sidewalls 117 are spaced from, such as spaced inward from (or relative to) housing sidewalls 17, such as spaced inward from inner surfaces 26 of sidewalls 17.

With reference to FIG. 1B, and with some embodiments, lower surface 47 of base plate 41 includes an annular ring (or groove) 120 into which the top of inner sidewalls 117 are received, for purposes of supporting base plate 41 of support plate 38.

An inner surface of the inner sidewalls and at least a portion of the lower surface of the base plate together define an inner chamber that resides below the support plate and within the housing chamber, the inner chamber is in fluid communication with the inlet in the housing, with some embodiments. With reference to FIG. 5, an inner surface 123 of inner sidewalls 117 and at least a portion of lower surface 47 of base plate 41 together define an inner chamber 126 that resides below support plate 38 and within housing chamber 20. Inner chamber 126 is in fluid communication with inlet 51 in housing 11. With further reference to FIG. 5, and in accordance with some embodiments, inlet 51 is in fluid communication with inlet pipe 57, which extends sealingly through housing sidewalls 17 and inner sidewalls 117. Inlet pipe 57 has a plurality of inlet pipe apertures 60 that are in fluid communication with inner chamber 126. Inlet pipe 57, with some embodiments, has a terminal plug 61. Liquid introduced through inlet 51 passes through inlet pipe 57 and out through inlet pipe apertures 60 into inner chamber 126, then passes up through support plate aperture 76 as indicated by arrow 79 and as described previously herein.

An exterior surface of the inner sidewalls and a portion of an inner surface of the housing sidewalls together define an annular chamber, and the annular chamber is in fluid communication with the outlet in the housing, with some embodiments. With reference to FIG. 5, an exterior surface 129 of inner sidewalls 117 and a portion 26' of inner surface 26 of housing sidewalls 17 together define an annular chamber 132. Annular chamber 132 is in fluid communication with outlet 67 in housing 11. With further reference to FIG. 5, annular chamber 132 is in fluid communication with outlet pipe 73, which extends sealingly through housing sidewall 17, and which is in fluid communication with outlet 67.

The base plate of the support plate has a side surface, the side surface of the base plate and a further portion of the inner surface of the housing sidewalls together define an annular opening that is in fluid communication with the annular chamber, with some embodiments. With reference to FIG. 5, base plate 41 of support plate 38 has a side surface 135. Side surface 135 of base plate 41 and a further portion 26' of inner surface 26 of housing sidewalls 17 together define an annular opening 138 that is in fluid communication with annular chamber 132.

With some embodiments, liquid is introduced into inlet 51, passes through inlet pipe 57, out through inlet pipe apertures 60, into inner chamber 126, up through support plate aperture 76, horizontally as a first portion (90) out through the extensions 82 and vertically as a second portion (96) through deflection plate holes 88. The introduced liquid contacts the solid chemical material within housing chamber 20 and forms a treated liquid that includes dissolved and/or eroded chemical material. The treated liquid, with some embodiments, passes down through annular opening 138 and into annular chamber 132. From annular chamber 132, the treated liquid, with some embodiments, passes through outlet pipe 73 and outlet 67. From outlet 67, the treated liquid can be forwarded for use and/or for storage, as will be described in further detail herein.

With some embodiments, when the introduction of liquid into the chemical feeder is stopped, a vacuum can be formed within the housing chamber as liquid flows out through the outlet. The formation of a vacuum within the housing chamber can make it difficult to remove the lid from the housing and/or to drain residual liquid from the housing chamber. The chemical feeder, with some embodiments, includes a vacuum release apparatus, that allows the vacuum to be released from the housing chamber, which allows liquid to be drained from the housing chamber, and the lid to be removed, such as for purposes of inspecting and/or servicing the interior of the housing, and/or introducing fresh solid chemical material into the housing chamber. With some embodiments, the vacuum release apparatus is positioned vertically above the outlet of the chemical feeder. With reference to FIG. 5, chemical feeder 1 includes a vacuum release apparatus 141 that includes a vacuum release conduit 144 that extends through sidewalls 17, and a valve 147 that extends into vacuum release conduit 144, which can be operated manually and/or mechanically. When valve 147 is opened, the exterior atmosphere, such as air, passes through vacuum release conduit 144 and into housing chamber 20 so as to release any vacuum formed therein, which allows liquid to drain out through outlet pipe 73 and outlet 67.

In accordance with some further embodiments, the engagement between lid 29 and the top of housing sidewalls 17 is a non-sealing engagement, and as such, when the introduction of liquid into the chemical feeder is stopped, a vacuum is not formed within the housing chamber as liquid flows out through the outlet.

The support plate of the chemical feeder, with some embodiments, includes a plurality of arcuate extensions that extend upward from the upper surface of the base plate. With reference to FIG. 3A and FIG. 3B, support plate 150 includes a plurality of arcuate extensions 153 that extend upward from upper surface 44 of base plate 41 of support plate 150.

Support plate 150 also includes a deflection plate 85 positioned vertically above and spaced from support plate aperture 76. As described previously herein with regard to support plate 38 and chemical feeder 1, liquid introduced into housing 11, such as through inlet 51, passes up through support plate aperture 76 (indicated by arrow 79). Deflection plate 85 includes at least one deflection plate hole 88 therethrough. As described previously herein with regard to support plate 38, deflection plate 85 deflects horizontally a first portion (indicated by arrows 90) of liquid passing up through support plate aperture 76, and a second portion of liquid passing up through support plate aperture 76 passes vertically through deflection plate holes 88 (indicated by arrows 93).

The plurality of arcuate extensions, with some embodiments, extend spirally outward relative to the support plate aperture, and together define an impeller pattern. With reference to FIG. 3A, arcuate extensions 153 extend spirally outward relative to (or from) support plate aperture 76, and together define an impeller pattern (or fan pattern) 154 as depicted.

With some embodiments, and in addition to together defining an impeller pattern, the plurality of arcuate extensions include a plurality of arcuate extension pairs, and each arcuate extension pair together defines an arcuate channel there-between. With some embodiments, each arcuate extension and a neighboring arcuate extension together form a pair of arcuate extensions, which together define an arcuate channel there-between. With reference to FIG. 3A, arcuate extensions 153 include pairs of arcuate extensions 156 that together define an arcuate channel 159 there-between.

With further reference to FIG. 3A, and in accordance with some embodiments, liquid passing up through support plate aperture 76 which is deflected horizontally by deflection plate 85 (as indicated by arrows 90) passes arcuately through the plurality of arcuate channels 159. Without intending to be bound by any theory, it is believed that passing through the arcuate channels 159 provides the liquid with a spiral or torsional pattern that moves up through and/or around the solid chemical material that is supported and resides above support plate 150.

The deflection plate, with some embodiments, is supported, and positioned vertically above and spaced from the support plate aperture, by a portion of the arcuate extensions. With reference to FIG. 3A and FIG. 3B, deflection plate 85 is supported, and positioned vertically above and spaced from support plate aperture 76, by a portion of arcuate extensions 153.

The arcuate extensions each independently have an arcuate extension height above the upper surface of the base plate, and the lower surface of the deflection plate has a height (a deflection plate height) above the upper surface of the base plate. With some embodiments, each arcuate extension has an arcuate extension height that is equal to or greater than the deflection plate height, and correspondingly, each arcuate extension height is not less than the deflection plate height. With some further embodiments, at least some arcuate extensions have an arcuate extension height that is substantially constant along the length of the arcuate extension. At least some arcuate extensions, with some additional embodiments, have an extension height that is variable along the length of the arcuate extension, such as (but not limited to) having an arcuate extension height that increases (such as, but not limited to, steadily) along the length of the arcuate extension, as the arcuate extension extends outward relative to (or from) the support plate aperture.

Each arcuate extension, with some embodiments, has an arcuate extension height above the upper surface of the base plate of the support plate, each arcuate extension height is substantially equivalent to each other, the lower surface of the deflection plate has a second height (or deflection plate height) above the upper surface of the base plate of the support plate, and the arcuate extension height and the second height are substantially equivalent. With reference to FIG. 3B, each arcuate extension 153 has an arcuate extension height 96 above upper surface 44 of base plate 41 of support plate 38, and each arcuate extension 96 height is substantially equivalent to each other arcuate extension height 96. The lower surface 102 of deflection plate 85 has a second height (or deflection plate height) 99 above upper surface 44 of base plate 41 of support plate 38. Each arcuate extension height 96 and the second height 99 (or the deflection plate height) are substantially equivalent (or equal) to each other.

Each arcuate extension can, with some embodiments, independently have an upper surface that is concave, convex, or substantially flat. The concave and convex upper surfaces of each arcuate extension can, with some embodiments have a cross-sectional shape selected from partial circular shapes, partial elliptical shapes, partial hyperbolic shapes, and partial polygonal shapes (such as, but not limited to, triangular shapes, rectangular shapes, pentagonal shapes, etc.).

Each arcuate extension, with some embodiments, has an upper surface that is a substantially flat surface. With reference to FIG. 3B, each arcuate extension 153 has an upper surface 162, and upper surface 162 is a substantially flat surface, as depicted.

The arcuate extensions of the support plate can each independently have any suitable shape. With some embodiments, each arcuate extension independently has a cross-sectional shape selected from circular shapes, ellipsoid shapes, polygonal shapes, and combinations of two or more thereof. The cross-sectional shape of the arcuate extensions, with some embodiments, is a lateral cross-sectional shape.

With some embodiments, the plurality of arcuate extensions (or a portion of the plurality of arcuate extensions) support the solid chemical material above the upper surface of the base plate of the support plate. The arcuate extensions can, with some embodiments, directly and/or indirectly support the solid chemical material. Some of the solid chemical material, with some embodiments, is in direct contact with at least some of the arcuate extensions, and as such is directly supported by such arcuate extensions. Some of the solid chemical material, with some embodiments, is in direct contact with the deflection plate, and is indirectly supported by the arcuate extensions that support the deflection plate. The support of solid chemical material (such as tablet(s) 50) by the plurality of arcuate extensions above the upper surface of the base plate of the support plate is, with some embodiments, as described previously herein with reference to support plate 38 and FIG. 5, in which extensions 82 are substituted with arcuate extensions 153 (not shown).

As described previously herein, the deflection plate, with some embodiments, extends over less than the total upper surface area of the base plate of the support plate. The base plate of the support plate, with some embodiments, has an upper surface area, and the deflection plate extends over less than all of the upper surface area of the base plate of the support plate. With non-limiting reference to FIG. 3B, base plate 41, of support plate 150, has an upper surface area, such as determined with regard to diameter 108 thereof, and deflection plate 85 extends over less than all of the upper surface area of base plate 41 of support plate 150. With some embodiments, the deflection plate extends over less than 50 percent of the upper surface area the base plate, such as from 5 percent to 45 percent, or from 10 percent to 30 percent, or from 15 percent to 25 percent of the upper surface area the base plate.

The base plate of the support plate, with some embodiments, has an outer rim that extends upward relative to the upper surface of the base plate. With reference to FIG. 3B, base plate 41 of support plate 150 has an outer rim 111 that extends upward relative to upper surface 44 of base plate 41. With some embodiments, and not intending to be bound by any theory, it is believed that the outer rim of the base plate serves to maintain a level of liquid above the upper surface of the base plate, so as to optimize contact of liquid moving across the base plate with the bottom or lower surfaces of the solid chemical material that resides and is supported thereabove.

The outer rim of the base plate can have any suitable height above the upper surface of the base plate. With some embodiments, the outer rim has a height (an outer rim height) that is equal to or greater than (and correspondingly, not less than) the height of the lower surface of the deflection plate above the upper surface of the base plate (the deflection plate height). With some further embodiments: each arcuate extension independently has an arcuate extension height that is less than, equal to, or greater than the height of the outer rim, provided that: (i) each arcuate extension has a height that is equal to or greater than (and correspondingly, not less than) the deflection plate height; and (ii) the outer rim height is equal to or greater than (and correspondingly, not less than) the deflection plate height.

Each arcuate extension, has an arcuate extension height above the upper surface of the base plate, each arcuate extension height is substantially equivalent to each other, the outer rim has an outer rim height above the upper surface of the base plate, and each arcuate extension height and the outer rim height are substantially equivalent to each other. With non-limiting reference to FIG. 3B, each arcuate extension 153 has an arcuate extension height 96 above upper surface 44 of base plate 41, each arcuate extension height 96 is substantially equivalent to each other arcuate extension height 96, outer rim 111 has an outer rim height 114 above upper surface 44 of base plate 41, and each arcuate extension height 96 and the outer rim height 114 are substantially equivalent.

Figure 7:
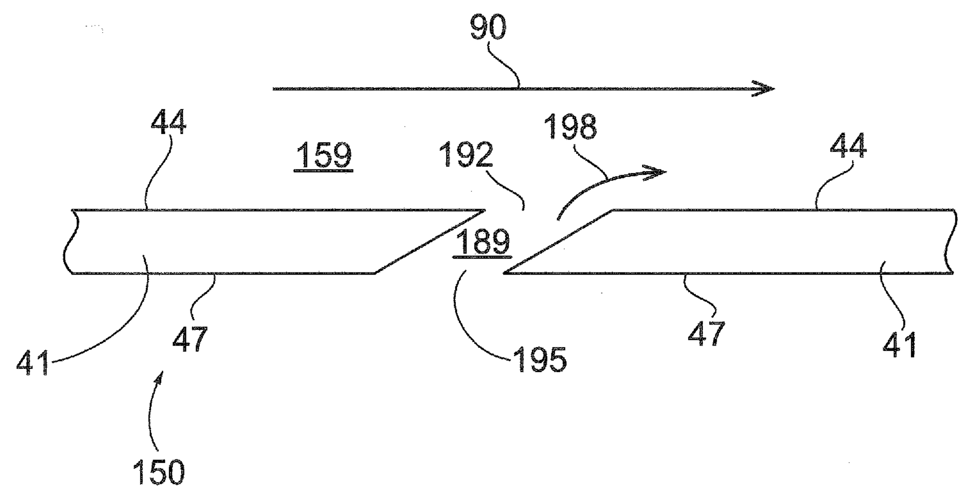
FIG. 7 is a representative side elevational sectional view of a base plate of a support plate according to some embodiments of the present invention, which has an arcuate channel aperture.

The base plate, of the support plate which includes arcuate extensions, with some embodiments, further includes a plurality of arcuate channel apertures that reside in at least one arcuate channel, each arcuate channel aperture has an upper opening that is in fluid communication with the arcuate channel and a lower opening in the lower surface of the base plate, the upper opening is positioned downstream relative to the lower opening, and relative to a direction of flow of liquid through the arcuate channel. With reference to FIG. 3A and FIG. 7, base plate 41 of support plate 150 includes a plurality of arcuate channel apertures 189, which reside in (or within) at least some of the arcuate channels 159. With reference to FIG. 7, each arcuate channel aperture 189 has an upper opening 192 that is in fluid communication with arcuate channel 159, and a lower opening 195 that is positioned in lower surface 47 of base plate 41. Upper opening 192 is positioned downstream relative to lower opening 195, and in each case relative to the direction of flow of liquid through arcuate channel 159, as indicated by arrow 90. While not intending to be bound by any theory, it is believed that the relative positioning of the upper (192) and lower (195) openings of arcuate channel apertures 189, serves to provide liquid passing up therethrough with a downstream vector as indicated by arrow 198. With some embodiments, it is believed that liquid passing up through the arcuate channel apertures 189 serves to further propel the horizontally deflected liquid (as indicated by arrows 90) that previously passed up through support plate aperture 76, through one or more of the arcuate channels 159.

The arcuate channel apertures can each independently have any suitable shape and dimensions. With some embodiments, the arcuate channel apertures are substantially cylindrical in shape, and each independently have a diameter of 0.25 cm to 1.9 cm (0.1 inches to 0.75 inches). With some further embodiments, the arcuate channel apertures are substantially cylindrical in shape, and each independently have an angle relative to horizontal of greater than 0 degrees and less than 90 degrees, such as from 10 to 75 degrees, or from 20 to 60 degrees, or from 30 to 50 degrees.

The support plate of the chemical feeder, with some embodiments, includes a spiral extension that extends upward from the upper surface of the base plate, the spiral extension extends spirally outward relative to (or from) the support plate aperture, and the spiral extension defines a spiral channel. With some embodiments, the support plate includes a single spiral extension. With reference to FIG. 4A and FIG. 4B, support plate 165 includes a spiral extension 168 that extends upward from upper surface 44 of base plate 41 of support plate 165. Spiral extension 168 extends spirally outward relative to (or from) support plate aperture 76. In addition, spiral extension 168 defines a spiral channel 171.

Support plate 165 also includes a deflection plate 85 positioned vertically above and spaced from support plate aperture 76. As described previously herein with regard to support plate 38 and chemical feeder 1, liquid introduced into housing 11, such as through inlet 51, passes up through support plate aperture 76 (indicated by arrow 79). Deflection plate 85 includes at least one deflection plate hole 88 therethrough. As described previously herein with regard to support plate 38, deflection plate 85 deflects horizontally a first portion (indicated by arrows 90) of liquid passing up through support plate aperture 76, and a second portion of liquid passing up through support plate aperture 76 passes vertically through deflection plate holes 88 (indicated by arrows 93).

With further reference to FIG. 4A, and in accordance with some embodiments, liquid passing up through support plate aperture 76 which is deflected horizontally by deflection plate 85 (as indicated by arrows 90) passes spirally through spiral channel 171. Without intending to be bound by any theory, it is believed that passing through spiral channel 171 provides the liquid with a spiral or torsional pattern that increases the linear fluid velocity for a given volume of liquid, relative to the linear velocity for such volume of liquid moving in a linear/radial direction.

The deflection plate, with some embodiments, is supported, and positioned vertically above and spaced from the support plate aperture, by a portion of the spiral extension. With reference to FIG. 4A and FIG. 4B, deflection plate 85 is supported, and positioned vertically above and spaced from support plate aperture 76, by a portion of spiral extension 168.

The spiral extension has a spiral extension height above the upper surface of the base plate, and the lower surface of the deflection plate has a height (a deflection plate height) above the upper surface of the base plate. With some embodiments, the spiral extension has a spiral extension height that is equal to or greater than the deflection plate height, and correspondingly, the spiral extension height is not less than the deflection plate height. With some further embodiments, the spiral extension has a spiral extension height that is substantially constant along the length of the spiral extension. The spiral extension, with some additional embodiments, has a spiral extension height that is variable along the length of the spiral extension, such as (but not limited to) having a spiral extension height that increases (such as, but not limited to, steadily) along the length of the spiral extension, as the spiral extension extends spirally outward relative to (or from) the support plate aperture.

The spiral extension, with some embodiments, has a spiral extension height above the upper surface of the base plate of the support plate, the lower surface of the deflection plate has a second height (or deflection plate height) above the upper surface of the base plate of the support plate, and the spiral extension height and the second height (or deflection plate height) are substantially equivalent. With reference to FIG. 4B, spiral extension 168 has a spiral extension height 96 above upper surface 44 of base plate 41 of support plate 165, and the spiral extension 96 height is substantially constant along the length of spiral extension 165. The lower surface 102 of deflection plate 85 has a second height (or deflection plate height) 99 above upper surface 44 of base plate 41 of support plate 165. The spiral extension height 96 and the second height 99 (or the deflection plate height) are substantially equivalent (or equal) to each other.

The spiral extension, with some embodiments, has a height of from 0.1 cm to 5.0 cm, or from 0.3 cm to 2.5 cm, or from 0.5 cm to 1.0 cm. In accordance with some embodiments, the spiral channel has an average width of from 0.2 cm to 8.0 cm, or from 0.5 cm to 5.0 cm, or from 1.2 cm to 2.6 cm. In accordance with some further embodiments, the width of the spiral channel is substantially constant along its length. The width of the spiral channel is, with some alternative embodiments, variable along its length. The terminal width of the spiral channel 171 at the terminus 206 of spiral extension 168 is less than the average width of the spiral channel, with some embodiments, such as from 5% to 80% less, or from 10% to 75% less or from 20% to 60% less than the average width of the spiral channel.

The spiral extension can, with some embodiments, have an upper surface that is concave, convex, or substantially flat. The concave and convex upper surfaces of spiral extension can, with some embodiments have a cross-sectional shape selected from partial circular shapes, partial elliptical shapes, partial hyperbolic shapes, and partial polygonal shapes (such as, but not limited to, triangular shapes, rectangular shapes, pentagonal shapes, etc.).

The spiral extension, with some embodiments, has an upper surface that is a substantially flat surface. With reference to FIG. 4B, spiral extension 168 has an upper surface 174, and upper surface 174 is a substantially flat surface, as depicted.

The spiral extension of the support plate can have any suitable shape. With some embodiments, the spiral extension has a cross-sectional shape selected from circular shapes, ellipsoid shapes, polygonal shapes, and combinations of two or more thereof. The cross-sectional shape of the spiral extension, with some embodiments, is a lateral cross-sectional shape.

With some embodiments, the spiral extension (or a portion of the spiral extension) supports the solid chemical material above the upper surface of the base plate of the support plate. The spiral extension can, with some embodiments, directly and/or indirectly support the solid chemical material. Some of the solid chemical material, with some embodiments, is in direct contact with at least a portion of the spiral extension, and as such is directly supported by such portion (or portions) of the spiral extension. Some of the solid chemical material, with some embodiments, is in direct contact with the deflection plate, and is indirectly supported by that portion (or portions) of the spiral extension that supports the deflection plate. The support of solid chemical material (such as tablet(s) 50) by the spiral extension above the upper surface of the base plate of the support plate is, with some embodiments, as described previously herein with reference to support plate 38 and FIG. 5, in which extensions 82 are substituted with spiral extension 168 (not shown).

As described previously herein, the deflection plate, with some embodiments, extends over less than the total upper surface area of the base plate of the support plate. The base plate of the support plate, with some embodiments, has an upper surface area, and the deflection plate extends over less than all of the upper surface area of the base plate of the support plate. With non-limiting reference to FIG. 4B, base plate 41, of support plate 165, has an upper surface area, such as determined with regard to diameter 108 thereof, and deflection plate 85 extends over less than all of the upper surface area of base plate 41 of support plate 165. With some embodiments, the deflection plate extends over less than 50 percent of the upper surface area the base plate, such as from 5 percent to 45 percent, or from 10 percent to 30 percent, or from 15 percent to 25 percent of the upper surface area the base plate.

Figure 6:
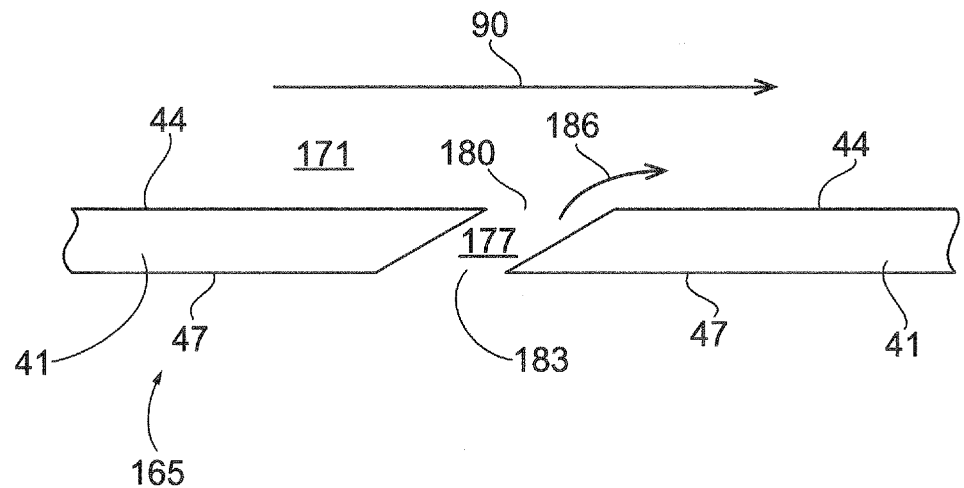
FIG. 6 is a representative side elevational sectional view of a base plate of a support plate according to some embodiments of the present invention, which has a spiral channel aperture.

The base plate, with some embodiments, further includes a plurality of spiral channel apertures that reside in the spiral channel, each spiral channel aperture has an upper opening that is in fluid communication with the spiral channel and a lower opening in the lower surface of the base plate, the upper opening is positioned downstream relative to the lower opening, and relative to a direction of flow of liquid through the spiral channel. With reference to FIG. 4A and FIG. 6, base plate 41 of support plate 165 includes a plurality of spiral channel apertures 177, which reside in (or within) spiral channel 171. With reference to FIG. 6, each spiral channel aperture 177 has an upper opening 180 that is in fluid communication with spiral channel 171, and a lower opening 183 that is positioned in lower surface 47 of base plate 41. Upper opening 180 is positioned downstream relative to lower opening 183, and in each case relative to the direction of flow of liquid through spiral channel 171, as indicated by arrow 90. While not intending to be bound by any theory, it is believed that the relative positioning of the upper (180) and lower (183) openings of spiral channel apertures 177, serves to provide liquid passing up therethrough with a downstream vector as indicated by arrow 186. With some embodiments, it is believed that liquid passing up through the spiral channel apertures 177 serves to further propel the horizontally deflected liquid (as indicated by arrows 90) that previously passed up through support plate aperture 76, through the spiral channel 171.

The spiral channel apertures can each independently have any suitable shape and dimensions. With some embodiments, the spiral channel apertures are substantially cylindrical in shape, and each independently have a diameter of 0.25 cm to 1.9 cm (0.1 inches to 0.75 inches). With some further embodiments, the spiral channel apertures are substantially cylindrical in shape, and each independently have an angle relative to horizontal of greater than 0 degrees and less than 90 degrees, such as from 10 to 75 degrees, or from 20 to 60 degrees, or from 30 to 50 degrees.

Support plate 165, with some embodiments, is free of an outer rim as depicted in the drawings. With some further embodiments, support plate 165 has an outer rim (not depicted in FIGS. 4A and 4B), such as outer rim 111 as described previously herein with regard to support plates 38, 38', and 150.

With some embodiments, spiral extension 168 extends spirally outward to an alignment point 200 where the outer wall 203 of spiral extension 168 is substantially vertically aligned with side surface 135 of base plate 41. The terminus 206 of spiral extension 168 extends no further past alignment point 203, with some embodiments. In accordance with some further embodiments, terminus 206 of spiral extension 168 does extend past alignment point 200, with outer wall 203 and side surface 135 in continuing alignment (as depicted in FIG. 4A), such as through an angle of rotation that is greater than 0° and less than or equal to 180°, such as from 5° to 160°, or from 10° to 150°, or from 15° to 140° (when base plate 41 is substantially circular).

With some further embodiments, when terminus 206 of spiral extension 168 extends past alignment point 200 (with outer wall 203 and side surface 135 of base plate 41 in continuing alignment): (i) the width 212 of spiral extension 168 remains the same, and the width 215 of spiral channel 171 decreases past alignment point 200; or (ii) the width 212 of spiral extension 168 decreases (such as to a point) and the width 215 of spiral channel 171 remains substantially the same past alignment point 200. With some further embodiments, as the width 212 of spiral extension 168 remains the same past alignment point 200, terminus 206 of spiral extension 168 extends spirally past alignment point 200 until the width 215 of spiral channel 171 has decreased by 10%, or 15%, or 20%, or 25%, or 40%, or 50%, relative to the width of spiral channel 171 at alignment point 200. With some additional embodiments, as the width 212 of spiral extension 168 decreases past alignment point 200, the radius of inner wall 209 of spiral extension 168 increases past alignment point 200, and the radius of outer wall 203 remains substantially constant past alignment point 200, and correspondingly the width 212 of spiral extension 168 decreases past alignment point 200.

The chemical feeders of the present invention and the various components thereof, such as the support plate, can be fabricated from any suitable material or combination of materials that are chemically and corrosion resistant to the solid chemical material and fluids (or liquids) used. Examples of suitable fabrication materials include, but are not limited to, polyethylene, ABS (acrylonitrile-butadiene-styrene resin), fiberglass reinforced resins, polystyrene, polypropylene, poly (vinyl chloride), chlorinated poly(vinyl chloride) or any other appropriate material(s) that is chemically resistant to the solid chemical being dispensed, such as a sanitizing agent, such as calcium hypochlorite. Other materials such as stainless steel can additionally or alternatively be used, but the use of such materials can be disadvantageous and undesirable, with some embodiments, for reasons including, for example, a significant increase in cost of the feeder and/or corrosion of such materials by the solid/dissolved chemical material. With some embodiments, the chemical feeder, including the support plate, is fabricated from poly(vinyl chloride) (PVC), which is generally chemically resistant to water sanitizing chemicals, such as calcium hypochlorite. In accordance with some further embodiments of the present invention, at least a portion of the sidewalls (such as sidewalls 17) is fabricated from transparent PVC, which allows for visual inspection of the amount of solid chemical material present in housing chamber (such as housing chamber 20) without opening the housing. Plastic parts of the chemical feeder can be fabricated by art-recognized methods including, but not limited to, injection molding or rotational molding.

When constructed of plastic resin material, the various parts of the chemical feeder can, with some embodiments, be joined by solvent or heat welding or by threading. If a metal, such as stainless steel is used, conventional welding of the parts can be used to fabricate the chemical feeder. Alternatively, the various parts of the chemical feeder can be joined by conventional threaded bolts and appropriate gasketing to insure that the chemical feeder is sealed, such as being liquid-tight, such as water-tight. Liquid inlet 51 and liquid outlet 67 can, with some embodiments, be joined to feed and removal conduits (not shown) by, for example, matched threaded sections, quick release fittings, plastic welding, and/or adhesives (not shown).

The various gaskets or seals, such as annular gaskets associated with the lid, used in the chemical feeder are, with some embodiments, fabricated from resilient materials that are resistant to the solid chemical materials and liquids used. Examples of materials from which the gaskets can be fabricated include, but are not limited to, rubber, such as natural rubber, styrene-butadiene rubber, neoprene rubber, silicone rubber, and ethylene propylene diene monomer (EPDM) rubber; and fluorinated materials, such as, fluorinated elastomers, such as VITON fluoroelastomer (commercially available from DuPont), homopolymers and copolymers of tetrafluoroethylene and chlorotrifluoroethylene, and copolymers of vinylidene fluoride and hexafluoropropylene.

The solid chemical material, or treating agent, used with the chemical feeders of the present invention can be any chemical that is solid at ambient (or standard) conditions of temperature and pressure (STP), and which is at least partially soluble in the liquid, such as water, that is introduced into the chemical feeder, at STP conditions. With some further embodiments, the solid chemical material is capable of being formed into pellets or tablets. The solid chemical material, with some further embodiments, is in the form of tablets that have a diameter which is greater than: (i) the diameter of the opening(s) in the base plate, such as support plate opening 76 and channel apertures 177; and (ii) the width of the annular opening 138. Examples of such solid chemical materials, include, but are not limited to: sanitizing agents, such as chemicals that sanitize water, such as calcium hypochlorite, halogenated hydantoins (such as, 1-bromo-3-chloro-5,5-dimethylhydantoin and 1,3-dichloro-5,5-dimethylhydantoin), and chlorinated isocyanurates (such as trichloro-s-triazinetriones); dechlorination agents such as sodium sulfite, sodium metabisulfite, sodium bisulfite, sodium thiosulfate, sodium hydrosulfide (NaSH), sodium sulfide ($Na_2S$), and ascorbic acid; and pH control agents such as sodium bisulfate, citric acid, sodium carbonate, and sodium bicarbonate.

The chemical feeder of the present invention can, with some embodiments, be integrated into fluid, such as water, treatment operations by appropriate piping connected with inlet 51 and outlet 67. The chemical feeder can be integrated into, for example: a single pass system, such as an aqueous stream used to sanitize the surface of an article, such as vegetables, such as potatoes or surfaces used in the handling or processing of food; or a closed loop system, such as a swimming pool or hot tub. With some embodiments, the chemical feeder via inlet 51 and outlet 67, is connected directly (such as in-line) with the main fluid conduit used to recycle and treat fluid, such as water, from a stationary body of fluid, such as a swimming pool.

Various modifications can be made to the chemical feeder of the present invention without departing from the spirit and scope thereof. For purposes of non-limiting illustration, the solid chemical materials can be contained within the housing chamber in one or more canisters or baskets having a plurality of perforations therein, which allow for contact between the solid chemical material and liquid (or fluid) within the housing chamber. The use of canisters or baskets, with some embodiments, can be advantageous when it is desirable to minimize direct contact of the solid chemical with the person who is placing it into the chamber. When one or more canisters are used to place solid chemical material within the housing chamber of the chemical feeder, the housing and canister can be together keyed or otherwise adapted to only allow the insertion of a specifically designed canister into the housing chamber. Keying of the housing and canisters can be used as a method of preventing the addition of incompatible chemical materials to the chamber, such as calcium hypochlorite and chloroisocyanurates. For example and with non-limiting reference to FIG. 5, interior surface 26 of sidewalls 17 of chemical feeder 1 can be provided with a vertically elongated raised rectangular member (not shown) that mates slidingly with a matching vertically elongated female slot in the side of a canister that is placed within housing chamber 20 (not shown). Such further non-limiting embodiments demonstrate that a wide variety of modifications can be made to the chemical feeder of the present invention without significantly affecting the operation thereof.

The present invention also relates to a method of treating, such as sanitizing, a body of liquid, such as a body of water, such as a swimming pool. The liquid treating method comprises: (a) providing a chemical feeder as described previously herein, wherein the housing chamber contains solid chemical material; (b) introducing, optionally under elevated pressure, a liquid stream (such as an aqueous stream) drawn from a body of liquid (such as a body of water) into the inlet of the chemical feeder; (c) removing a treated liquid stream (such as a treated aqueous stream) containing treating material (such as sanitizing material) from the outlet of the chemical feeder; and (d) introducing at least a portion of the treated liquid stream into the body of liquid. Steps (b) through (d) are performed continuously, with some embodiments.

With some embodiments of the method of the present invention, the inlet of the chemical feeder is connected directly in-line with a main water conduit used to handle water withdrawn from a body of water. In this configuration, the outlet of the pump used to recycle the water is in direct fluid communication (by way of a suitable conduit) with the inlet of the chemical feeder, in which case the chemical feeder is located on the pressure side of the recycle pump. The pressure of the liquid stream (such as an aqueous stream) introduced into the inlet of the chemical feeder can vary widely, and is with some embodiments from 5 pounds per square inch (psi) (34 kilopascals) to 15 psi (103 kilopascals), or from 5 psi to 10 psi (69 kilopascals). The flow rate of the liquid stream (such as an aqueous stream) through the chemical feeder can also vary widely, and is, with some embodiments, from 2 to 100 gallons per minute (7.6 to 379 liters per minute), or from 5 to 75 gallons per minute (19 to 284 liters per minute), or from 10 to 50 gallons per minute (38 to 189 liters per minute).

The present invention is more particularly described in the examples that follow, which are intended to be illustrative only, since numerous modifications and variations therein will be apparent to those skilled in the art.

EXAMPLES

In the following examples, support plates of different designs were evaluated in the same feeder under the same conditions to determine and compare average chlorine delivery rates associated with the different support plates. The combination of the feeder and Support Plate 1 is a comparative chemical feeder, and the combination of the feeder with each of Support Plates 2-5 are in each case representative of chemical feeders according to the present invention.

Each of Support Plates 1-5 were provided with an annular groove of about 0.64 cm (about 0.25 inches) in depth on the lower surface thereof, into which was sealingly received the upper portion of a cylindrical support fabricated from polyvinylchloride (PVC) pipe having a height of about 15.24 cm (about 6 inches) and diameter of 30.5 cm (12 inches). The cylindrical support resided within the housing of the feeder, and extended upward from the inner surface of the base of the housing of the feeder.

Support Plate 1

Support Plate 1 was flat, circular, and fabricated from PVC, had a diameter of 40.6 cm (16 inches), and a thickness of 1.27 cm (0.5 inches). Support Plate 1 had 34 evenly spaced holes there-through, each having a diameter of 3.18 cm (1.25 inches).

Support Plate 2

Support Plate 2 was circular, fabricated from PVC, included a plurality of arcuate extensions, and was similar to that depicted in FIG. 3A and FIG. 3B of the drawings.

More particularly, Support Plate 2 had a diameter of 40.6 cm (16 inches), a centrally located support plate aperture in the base plate thereof having a diameter of 7.6 cm (3 inches), and 10 equally spaced and equivalent arcuate extensions that extended outward from the support plate aperture in an impeller pattern, and which correspondingly together defined 10 equally spaced and equivalent arcuate channels between pairs thereof. Support Plate 2 also included an outer rim having a flat top and a height of 0.64 cm (0.25 inches) above the base plate of Support Plate 2. Each arcuate extension had a flat top, a thickness of 0.64 cm (0.25 inches), a height (above the base plate) of 0.64 cm (0.25 inches), and ended 1.3 cm (0.5 inches) from the inner surface of the outer rim.

Support Plate 2 further included a deflection plate fabricated from PVC, which had a diameter of 12.7 cm (5 inches), a thickness of 0.32 cm (0.125 inches), and included 5 equally spaced holes (in a cruciform pattern with 4 holes spaced evenly relative to a central hole) each having a diameter of 0.95 cm (0.375 inches). The deflection plate was positioned centrally over the centrally located support plate aperture and rested adhesively (using PVC cement) directly on a portion of the upper surfaces of the arcuate extensions.

Support Plate 3

Support Plate 3 was circular, fabricated from PVC, included a spiral extension, and was similar to that depicted in FIG. 4A and FIG. 4B of the drawings. Support Plate 3 did not include spiral channel apertures, and the width of the spiral channel was substantially constant throughout its length.

More particularly, Support Plate 3 had a diameter of 40.6 cm (16 inches), a centrally located support plate aperture in the base plate thereof having a diameter of 7.6 cm (3 inches), and a spiral extension having a flat top, a thickness of 0.64 cm (0.25 inches) along most of its length, and a height of 1.3 cm (0.5 inches) above the base plate thereof, which extended spirally outward relative to the support plate aperture. The spiral extension of Support Plate 3 had a spiral radius that increased by 3.2 cm (1.25 inches) per 360° turn, which was maintained throughout the length of the spiral extension. The spiral extension defined a spiral channel having a width of 2.54 cm (1.0 inch) that was maintained throughout its length. The width of the spiral extension narrowed to a point at it terminus.

Support Plate 3 further included a deflection plate fabricated from PVC, which had a diameter of 12.7 cm (5 inches), a thickness of 0.32 cm (0.125 inches), and included 5 equally spaced holes (in a cruciform pattern with 4 holes spaced evenly relative to a central hole) each having a diameter of 0.95 cm (0.375 inches). The deflection plate was positioned centrally over the centrally located support plate aperture, and elevated 0.64 cm (0.25 inches) above the upper flat top of the spiral extension, by spacers interposed there-between.

Support Plate 4

Support Plate 4 was circular, fabricated from PVC, included a spiral extension, and was similar to that depicted in FIG. 4A and FIG. 4B of the drawings. Support Plate 4 included a number of irregularly positioned spiral channel apertures, and the width of the spiral channel was substantially constant throughout its length.

More particularly, Support Plate 4 had a diameter of 40.6 cm (16 inches), a centrally located support plate aperture in the base plate thereof having a diameter of 7.6 cm (3 inches), and a spiral extension having a flat top, a thickness of 0.64 cm (0.25 inches) along most of its length, and a height of 1.3 cm (0.5 inches) above the base plate thereof, which extended spirally outward relative to the support plate aperture. The spiral extension of Support Plate 4 had a spiral radius that increased by 3.2 cm (1.25 inches) per 360° turn, which was maintained throughout the length of the spiral extension. The spiral extension defined a spiral channel having a width of 2.54 cm (1.0 inches) that was maintained throughout its length. The width of the spiral extension narrowed to a point at it terminus.

Support Plate 4 further included a deflection plate fabricated from PVC, which had a diameter of 12.7 cm (5 inches), a thickness of 0.32 cm (0.125 inches), and included 5 equally spaced holes (in a cruciform pattern with 4 holes spaced evenly relative to a central hole) each having a diameter of 0.95 cm (0.375 inches). The deflection plate was positioned centrally over the centrally located support plate aperture, and rested adhesively (using PVC cement) directly on a portion of the upper surfaces of the spiral extension.

Support Plate 4 included a number of irregularly positioned spiral channel apertures in the spiral channel thereof. Each spiral channel aperture had a diameter of 0.64 cm (0.25 inches) and an angle of about 45° relative to vertical, with the top of each spiral channel aperture being positioned downstream relative to the direction of fluid flow through the spiral channel. The bottom of each spiral channel aperture correspondingly was positioned upstream relative to the direction of fluid flow through the spiral channel.

Support Plate 5

Support Plate 5 was circular, fabricated from PVC, included a spiral extension, and was similar to that depicted in FIG. 4A and FIG. 4B of the drawings. Support Plate 5 included a number of regularly positioned spiral channel apertures, and the width of the spiral channel narrowed towards the terminus thereof.

More particularly, Support Plate 5 had a diameter of 40.6 cm (16 inches), a centrally located support plate aperture in the base plate thereof having a diameter of 7.6 cm (3 inches), and a spiral extension having a flat top, a thickness of 0.64 cm (0.25 inches) along its entire length, and a height of 0.64 cm (0.25 inches) above the base plate thereof, which extended spirally outward relative to the support plate aperture. The spiral extension of Support Plate 5 had a spiral radius that increased by 1.90 cm (0.75 inches) per 360° turn, which was maintained throughout the length of the spiral extension. The spiral extension defined a spiral channel having a width of 1.3 cm (0.5 inches) that was maintained throughout most of its length, but which narrowed to 0.64 cm (0.25 inches) at its terminus. The width of the spiral extension was constant throughout its length. The spiral extension of Support Plate 5 ended at a blunt edge at its terminus.

Support Plate 5 further included a deflection plate fabricated from PVC, which had a diameter of 12.7 cm (5 inches), a thickness of 0.32 cm (0.125 inches), and included 5 equally spaced holes (in a cruciform pattern with 4 holes spaced evenly relative to a central hole) each having a diameter of 0.95 cm (0.375 inches). The deflection plate was positioned centrally over the centrally located support plate aperture, and rested adhesively (using PVC cement) directly on a portion of the upper surfaces of the spiral extension.

Support Plate 5 included a number of regularly positioned spiral channel apertures in the spiral channel thereof. Each spiral channel aperture had a diameter of 0.64 cm (0.25 inches) and an angle of about 45° relative to vertical, with the top of each spiral channel aperture being positioned downstream relative to the direction of fluid flow through the spiral channel. The bottom of each spiral channel aperture correspondingly was positioned upstream relative to the direction of fluid flow through the spiral channel. The spiral channel apertures of Support Plate 5 were positioned along equally spaced lines that extended radially outward relative to the center of Support Plate 5. Each equally spaced radial line (of which there were 8) included 4 separate spiral channel apertures.

Feeder Evaluations

In each of the following feeder evaluations, an ACCU-TAB Model 3150 flow-through feeder (commercially available from Axiall Corporation) was used, in which the support plate thereof was replaced with a support plate selected from Support Plates 1-5.

Evaluation 1

Support Plates 1-4 were each separately evaluated in an ACCU-TAB Model 3150 flow-through feeder. In each case, 19 ACCU-TAB BLUE SI calcium hypochlorite tablets (commercially available from Axiall Corporation, and containing calcium hypochlorite in an amount of 68 percent by weight, based on total weight) were positioned flat on the support plate to a height of three layers of tablets. Water was passed through the feed at a flow rate of 19 liters per minute (5.0 gallons per minute) continuously for 7 hours per day over a total of 4 successive days. The source water had a temperature of 21° C. (70° F.) and contained 10 ppm of free available chlorine. The tablets were kept in the feeder day-to-day, with additional tablets being periodically added to ensure that the top tablets of the stack remained above the water level within the feeder.

The feed water was periodically analyzed for chlorine content by art-recognized iodometric titration. Effluent samples were collected hourly from the feeder during operation and analyzed for chlorine content by art-recognized iodometric titration. The difference between the chlorine content of the feed and the effluent, and the flow rate of water through the feeder were used to calculate the chlorine delivery rate from the tablets. The average chlorine delivery rates, standard deviation, and percent variation were determined from data collected on days 2-4 of each evaluation, and are summarized in the following Table 1.

TABLE 1

| Support Plate | Average Chlorine Delivery rate (Lbs./hour) | Standard Deviation (Lbs./hour) | % Variation (St. Dev./ Average) |
|---|---|---|---|
| 1 | 0.27 | 0.13 | 48% |
| 2 | 0.25 | 0.08 | 32% |
| 3 | 0.50 | 0.30 | 60% |
| 4 | 1.27 | 0.31 | 25% |

The results summarized in Table 1 demonstrate the chemical feeders according to the present invention, such as represented by a chemical feeder containing Support Plates 2, 3, or 4, provide increased average chlorine delivery rates and/or reduced variation in the chlorine delivery rate relative to a comparative chemical feeder containing Support Plate 1.

Evaluation 2

Support Plates 1, 2, and 5 were each separately evaluated in an ACCU-TAB Model 3150 flow-through feeder. In each case, 19 ACCU-TAB BLUE SI calcium hypochlorite tablets (commercially available from Axiall Corporation, and containing calcium hypochlorite in an amount of 68 percent by weight, based on total weight) were positioned randomly in a pile on the support plate. Water was passed through the feed at a flow rate of 38 liters per minute (10.0 gallons per minute) continuously for 7 hours per day over a total of 4 successive days. The water had a temperature of 29° C. (84° F.) and contained 10 ppm of free available chlorine. The tablets were kept in the feeder day-to-day, with additional tablets being periodically added to ensure that upper tablets of the pile remained above the water level within the feeder.

The feed water was periodically analyzed for chlorine content by art-recognized iodometric titration. Effluent samples were collected hourly from the feeder during operation and analyzed for chlorine content by art-recognized iodometric titration. The difference between the chlorine content of the feed and the effluent, and the flow rate of water through the feeder were used to calculate the chlorine delivery rate from the tablets. The average chlorine delivery rates, standard deviation, and percent variation were determined from data collected on days 2-4 of each evaluation, and are summarized in the following Table 2.

TABLE 2

| Support Plate | Average Chlorine Delivery rate (Lbs./hour) | Standard Deviation (Lbs./hour) | % Variation (St. Dev./ Average) |
|---|---|---|---|
| 1 | 1.50 | 0.27 | 18% |
| 2 | 2.59 | 0.20 | 8% |
| 5 | 3.40 | 0.43 | 13% |

The results summarized in Table 2 demonstrate the chemical feeders according to the present invention, such as represented by a chemical feeder containing Support Plates 2 or 5, provide increased average chlorine delivery rates and reduced variation in the chlorine delivery rate relative to a comparative chemical feeder containing Support Plate 1.

The present invention has been described with reference to specific details of particular embodiments thereof. It is not intended that such details be regarded as limitations upon the scope of the invention except insofar as and to the extent that they are included in the accompanying claims.

What is claimed is:

1. A chemical feeder comprising:

(a) a housing having a housing base and housing sidewalls that together define a housing chamber within said housing;

(b) a support plate comprising a base plate having an upper surface and a lower surface, said support plate residing within said housing chamber and being positioned above an inner surface of said housing base, and said support plate being adapted to support a solid chemical material above said upper surface of said base plate;

(c) at least one inlet in said housing through which liquid is introduced into said housing, said inlet being positioned below said support plate; and (d) at least one outlet in said housing through which a treated liquid comprising dissolved chemical material is removed from said housing, wherein said support plate comprises, at least one support plate aperture extending from said lower surface to said upper surface of said base plate, through which liquid introduced through said inlet passes upward, a plurality of extensions extending upward from said upper surface of said base plate, each extension being a peg extension, and a deflection plate positioned vertically above and spaced from said support plate aperture, and said deflection plate comprising at least one deflection plate hole therethrough, wherein said deflection plate deflects horizontally a first portion of liquid passing up through said support plate aperture, and a second portion of liquid passing up through said support plate aperture passes vertically through said deflection plate hole.

2. The chemical feeder of claim 1, wherein said deflection plate is supported, and positioned vertically above and spaced from said support plate aperture, by a portion of said extensions.

3. The chemical feeder of claim 1, wherein each extension has an extension height above said upper surface of said base plate of said support plate, each extension height being substantially equivalent to each other, a lower surface of said deflection plate having a second height above said upper surface of said base plate of said support plate, each extension height and said second height being substantially equivalent.

4. The chemical feeder of claim 1, wherein each extension has an upper surface that is a substantially flat surface.

5. The chemical feeder of claim 1, wherein each extension independently has a cross-sectional shape selected from circular shapes, ellipsoid shapes, polygonal shapes, and combinations of two or more thereof.

6. The chemical feeder of claim 1, wherein said plurality of extensions are laterally spaced from each other.

7. The chemical feeder of claim 1, wherein said plurality of extensions support said solid chemical material above said upper surface of said base plate of said support plate.

8. The chemical feeder of claim 1, wherein said base plate of said support plate has an upper surface area, and said deflection plate extends over less than all of said upper surface area of said base plate of said support plate.

9. The chemical feeder of claim 1, wherein said base plate of said support plate has an outer rim that extends upward relative to said upper surface of said base plate.

10. The chemical feeder of claim 9, wherein each extension has an extension height above said upper surface of said base plate, each extension height is substantially equivalent to each other, said outer rim has an outer rim height above said upper surface of said base plate, wherein each extension height and said outer rim height are substantially equivalent.

11. The chemical feeder of claim 1 further comprising inner sidewalls extending upward from said inner surface of said housing base, said support plate being supported by said inner sidewalls, and said inner sidewalls being spaced from said housing sidewalls.

12. The chemical feeder of claim 11, wherein an inner surface of said inner sidewalls and at least a portion of said lower surface of said base plate together define an inner chamber that resides below said support plate and within said housing chamber, said inner chamber being in fluid communication with said inlet in said housing.

13. The chemical feeder of claim 12, wherein an exterior surface of said inner sidewalls and a portion of an inner surface of said housing sidewalls together define an annular chamber, said annular chamber being in fluid communication with said outlet in said housing.

14. The chemical feeder of claim 13, wherein said base plate of said support plate has a side surface, said side surface of said base plate and a further portion of said inner surface of said housing sidewalls together define an annular opening that is in fluid communication with said annular chamber.

15. A chemical feeder comprising:

(a) a housing having a housing base and housing sidewalls that together define a housing chamber within said housing;

(b) a support plate comprising a base plate having an upper surface and a lower surface, said support plate residing within said housing chamber and being positioned above an inner surface of said housing base, and said support plate being adapted to support a solid chemical material above said upper surface of said base plate;

(c) at least one inlet in said housing through which liquid is introduced into said housing, said inlet being positioned below said support plate; and (d) at least one outlet in said housing through which a treated liquid comprising dissolved chemical material is removed from said housing, wherein said support plate comprises, at least one support plate aperture extending from said lower surface to said upper surface of said base plate, through which liquid introduced through said inlet passes upward, a plurality of arcuate extensions extending upward from said upper surface of said base plate, and a deflection plate positioned vertically above and spaced from said support plate aperture, and said deflection plate comprising at least one deflection plate hole therethrough, wherein said deflection plate deflects horizontally a first portion of liquid passing up through said support plate aperture, and a second portion of liquid passing up through said support plate aperture passes vertically through said deflection plate hole.

16. The chemical feeder of claim 15, wherein said plurality of arcuate extensions extend spirally outward relative to said support plate aperture, and together define an impeller pattern.

17. The chemical feeder of claim 16, wherein said plurality of arcuate extensions comprise a plurality of arcuate extension pairs, and each arcuate extension pair together defines an arcuate channel there-between.

18. The chemical feeder of claim 17, wherein said base plate further comprises a plurality of arcuate channel apertures residing in at least one arcuate channel, each arcuate channel aperture having an upper opening being in fluid communication with said arcuate channel and a lower opening in said lower surface of said base plate, said upper opening being positioned downstream relative to said lower opening, and relative to a direction of flow of liquid through said arcuate channel.

19. The chemical feeder of claim 15, wherein said deflection plate is supported, and positioned vertically above and spaced from said support plate aperture, by a portion of said arcuate extensions.

20. The chemical feeder of claim 15, wherein each arcuate extension has an arcuate extension height above said upper surface of said base plate of said support plate, each arcuate extension height being substantially equivalent to each other, said lower surface of said deflection plate having a second height above said upper surface of said base plate of said support plate, said arcuate extension height and said second height being substantially equivalent.

21. The chemical feeder of claim 15, wherein each arcuate extension has an upper surface that is a substantially flat surface.

22. The chemical feeder of claim 15, wherein said plurality of arcuate extensions support said solid chemical material above said upper surface of said base plate of said support plate.

23. The chemical feeder of claim 15, wherein said base plate of said support plate has an upper surface area, and said deflection plate extends over less than all of said upper surface area of said base plate of said support plate.

24. The chemical feeder of claim 15, wherein said base plate of said support plate has an outer rim that extends upward relative to said upper surface of said base plate.

25. The chemical feeder of claim 24, wherein each arcuate extension has an arcuate extension height above said upper surface of said base plate, each arcuate extension height is substantially equivalent to each other, said outer rim has an outer rim height above said upper surface of said base plate, wherein each arcuate extension height and said outer rim height are substantially equivalent.

26. The chemical feeder of claim 15 further comprising inner sidewalls extending upward from said inner surface of said housing base, said support plate being supported by said inner sidewalls, and said inner sidewalls being spaced from said housing sidewalls.

27. The chemical feeder of claim 26, wherein an inner surface of said inner sidewalls and at least a portion of said lower surface of said base plate together define an inner chamber that resides below said support plate and within said housing chamber, said inner chamber being in fluid communication with said inlet in said housing.

28. The chemical feeder of claim 27, wherein an exterior surface of said inner sidewalls and a portion of an inner surface of said housing sidewalls together define an annular chamber, said annular chamber being in fluid communication with said outlet in said housing.

29. The chemical feeder of claim 28, wherein said base plate of said support plate has a side surface, said side surface of said base plate and a further portion of said inner surface of said housing sidewalls together define an annular opening that is in fluid communication with said annular chamber.

30. A chemical feeder comprising:

(a) a housing having a housing base and housing sidewalls that together define a housing chamber within said housing;

(b) a support plate comprising a base plate having an upper surface and a lower surface, said support plate residing within said housing chamber and being positioned above an inner surface of said housing base, and said support plate being adapted to support a solid chemical material above said upper surface of said base plate;

(c) at least one inlet in said housing through which liquid is introduced into said housing, said inlet being positioned below said support plate; and (d) at least one outlet in said housing through which a treated liquid comprising dissolved chemical material is removed from said housing, wherein said support plate comprises, at least one support plate aperture extending from said lower surface to said upper surface of said base plate, through which liquid introduced through said inlet passes upward, a spiral extension extending upward from said upper surface of said base plate, said spiral extension extending spirally outward relative to said support plate aperture, and said spiral extension defining a spiral channel, and a deflection plate positioned vertically above and spaced from said support plate aperture, and said deflection plate comprising at least one deflection plate hole therethrough, wherein said deflection plate deflects horizontally a first portion of liquid passing up through said support plate aperture, and a second portion of liquid passing up through said support plate aperture passes vertically through said deflection plate hole.

31. The chemical feeder of claim 30, wherein said deflection plate is supported, and positioned vertically above and spaced from said support plate aperture, by a portion of said spiral extension.

32. The chemical feeder of claim 30, wherein said spiral extension has a spiral extension height above said upper surface of said base plate of said support plate, said lower surface of said deflection plate having a second height above said upper surface of said base plate of said support plate, said spiral extension height and said second height being substantially equivalent.

33. The chemical feeder of claim 30, wherein said spiral extension has an upper surface that is a substantially flat surface.

34. The chemical feeder of claim 30, wherein said base plate further comprises a plurality of spiral channel apertures residing in said spiral channel, each spiral channel aperture having an upper opening being in fluid communication with said spiral channel and a lower opening in said lower surface of said base plate, said upper opening being positioned downstream relative to said lower opening, and relative to a direction of flow of liquid through said spiral channel.

35. The chemical feeder of claim 30, wherein said spiral extension supports said solid chemical material above said upper surface of said base plate of said support plate.

36. The chemical feeder of claim 30, wherein said base plate of said support plate has an upper surface area, and said deflection plate extends over less than all of said upper surface area of said base plate of said support plate.

37. The chemical feeder of claim 30 further comprising inner sidewalls extending upward from said inner surface of said housing base, said support plate being supported by said inner sidewalls, and said inner sidewalls being spaced from said housing sidewalls.

38. The chemical feeder of claim 37, wherein an inner surface of said inner sidewalls and at least a portion of said lower surface of said base plate together define an inner chamber that resides below said support plate and within said housing chamber, said inner chamber being in fluid communication with said inlet in said housing.

39. The chemical feeder of claim 38, wherein an exterior surface of said inner sidewalls and a portion of an inner surface of said housing sidewalls together define an annular chamber, said annular chamber being in fluid communication with said outlet in said housing.

40. The chemical feeder of claim 39, wherein said base plate of said support plate has a side surface, said side surface of said base plate and a further portion of said inner surface of said housing sidewalls together define an annular opening that is in fluid communication with said annular chamber.

* * * * *